US012781813B2

(12) United States Patent
Lee

(10) Patent No.: US 12,781,813 B2
(45) **Date of Patent: *Nov. 3, 2026**

(54) CALIPER BRAKE

(71) Applicant: HL MANDO CORPORATION, Gyeonggi-do (KR)

(72) Inventor: Yunseong Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 547 days.

This patent is subject to a terminal disclaimer.

(21) Appl. No.: 18/128,216

(22) Filed: Mar. 29, 2023

(65) Prior Publication Data

US 2023/0313853 A1 Oct. 5, 2023

(30) Foreign Application Priority Data

Mar. 31, 2022 (KR) ........................ 10-2022-0040394

(51) Int. Cl.
*F16D 55/227* (2006.01)
*B60T 1/06* (2006.01)
(Continued)

(52) U.S. Cl.
CPC ............ *F16D 55/227* (2013.01); *B60T 1/065* (2013.01); *F16D 65/0056* (2013.01);
(Continued)

(58) Field of Classification Search
CPC ............. F16D 55/227; F16D 55/22655; F16D 65/0075; F16D 65/0087; F16D 65/0978;
(Continued)

(56) References Cited

U.S. PATENT DOCUMENTS

| | | | | |
|---|---|---|---|---|
| 4,460,067 A * | 7/1984 | Katagiri | F16D 66/02 | 188/1.11 W |
| 8,540,060 B2 * | 9/2013 | Hayashi | F16D 66/02 | 188/73.38 |

(Continued)

FOREIGN PATENT DOCUMENTS

| | | |
|---|---|---|
| CN | 106337888 | 1/2017 |
| CN | 211343802 U * | 8/2020 |

(Continued)

OTHER PUBLICATIONS

Office Action (1st) dated Aug. 14, 2025 for Korean Patent Application No. 10-2022-0040394 and its English translation provided by Applicant's foreign counsel.

(Continued)

*Primary Examiner* — David R Morris
*Assistant Examiner* — Mahbubur Rashid
(74) *Attorney, Agent, or Firm* — WOMBLE BOND DICKINSON (US) LLP

(57) ABSTRACT

Disclosed herein is a caliper brake including a caliper housing provided such that a pressing member moves forward or rearward, a caliper bridge connected to the caliper housing and configured to press an outer brake pad toward a brake disc by a reaction force according to an operation of the pressing member, at least one guide rod fixedly installed in a carrier and configured to guide the sliding movement of the caliper housing and the caliper bridge relative to the carrier, and at least one outer pad spring mounted on a protrusion part formed at a side end of an outer pad plate on which the outer brake pad is fixedly installed and configured to elastically support the outer brake pad on a rear surface of the caliper bridge, wherein the caliper bridge includes an outer pad seat which is provided on the rear surface of the
(Continued)

caliper bridge and on which at least portions of the protrusion part and the outer pad spring are seated.

20 Claims, 21 Drawing Sheets

(51) Int. Cl.

| | |
|---|---|
| ***F16D 65/00*** | (2006.01) |
| ***F16D 65/097*** | (2006.01) |
| *F16D 55/00* | (2006.01) |
| *F16D 127/02* | (2012.01) |

(52) U.S. Cl.

CPC ..... *F16D 65/0075* (2013.01); *F16D 65/0978* (2013.01); *F16D 2055/0008* (2013.01); *F16D 2055/002* (2013.01); *F16D 2127/02* (2013.01)

(58) Field of Classification Search

CPC ....... F16D 2055/0008; F16D 2055/002; F16D 2127/02; F16D 59/02; F16D 55/40; F16D 55/226; F16D 55/28; F16D 65/0972; F16D 65/0979; F16D 55/32; F16D 65/186; F16D 65/0977; F16D 65/097; F16D 65/0975; F16D 2055/0029; F16D 2127/06; F16D 2055/0041; F16D 2055/007; F16D 55/02; F16D 2055/0016; F16D 55/2262; F16D 2065/1396; F16D 55/2265; F16D 65/0068; F16D 55/00; F16D 65/0971; F16D 2121/06; F16D 55/225; F16D 65/0976; F16D 65/28; F16D 65/84; F16D 67/04; F16D 13/69; F16D 2065/1348; F16D 55/24; F16D 2125/582; F16D 13/583; F16D 2125/08; F16D 65/122; F16D 13/585; F16D 2055/0037; F16D 2121/005; F16D 2121/10; F16D 2121/34; F16D 2125/565; F16D 23/14; F16D 25/126; F16D 65/0081; B60R 13/005

See application file for complete search history.

(56) References Cited

U.S. PATENT DOCUMENTS

| | | | | |
|---|---|---|---|---|
| 8,973,719 | B2 * | 3/2015 | Rossignol | F16D 65/095<br>188/73.31 |
| 9,360,068 | B2 * | 6/2016 | Noguchi | F16D 65/0978 |
| 9,388,869 | B2 * | 7/2016 | Zhang | F16D 65/12 |
| 9,568,059 | B2 * | 2/2017 | Yukumi | F16D 65/0977 |
| 9,689,445 | B2 * | 6/2017 | Merrien | F16D 55/228 |
| 10,030,723 | B1 * | 7/2018 | Liao | F16D 65/0075 |
| 10,760,630 | B2 * | 9/2020 | Liao | F16D 65/0087 |
| 2007/0051568 | A1 * | 3/2007 | Barbosa | F16D 55/227<br>188/73.45 |
| 2010/0326777 | A1 * | 12/2010 | Noguchi | F16D 65/0978<br>188/72.1 |
| 2013/0001024 | A1 * | 1/2013 | Odaira | F16D 55/226<br>188/72.3 |
| 2014/0110196 | A1 * | 4/2014 | Burgoon | B60T 13/22<br>188/72.3 |
| 2014/0326548 | A1 * | 11/2014 | Merrien | F16D 65/0977<br>188/73.38 |
| 2014/0345984 | A1 * | 11/2014 | Kamiya | F16D 65/0972<br>188/73.38 |
| 2014/0367208 | A1 * | 12/2014 | Miyake | F16D 55/227<br>188/72.3 |
| 2015/0001011 | A1 * | 1/2015 | Zhang | F16D 65/0972<br>188/72.3 |
| 2016/0076612 | A1 * | 3/2016 | Merrien | F16D 65/0972<br>188/72.4 |
| 2017/0307033 | A1 * | 10/2017 | Toguri | F16D 65/097 |
| 2018/0023640 | A1 | 1/2018 | Tomasz et al. | |
| 2020/0080601 | A1 | 3/2020 | Liao | |

FOREIGN PATENT DOCUMENTS

| | | | | | |
|---|---|---|---|---|---|
| CN | 112313426 | A | * | 2/2021 | F16D 65/0978 |
| EP | 0147522 | A1 | * | 7/1985 | F16D 55/227 |
| EP | 2807393 | B1 | * | 3/2020 | F16D 65/0978 |
| EP | 3640491 | B1 | * | 8/2021 | F16D 55/227 |
| JP | 55-65734 | | | 5/1980 | |
| JP | 9-229112 | | | 9/1997 | |
| JP | 2000-74108 | | | 3/2000 | |
| JP | 3830211 | B2 | * | 10/2006 | |
| JP | 5583533 | B2 | * | 9/2014 | F16D 65/0977 |
| JP | 5631710 | B2 | * | 11/2014 | |
| KR | 10-2013-0084031 | | | 7/2013 | |
| KR | 20170139879 | A | * | 12/2017 | F16D 65/0068 |
| KR | 20200130933 | A | * | 11/2020 | F16D 65/0081 |
| KR | 10-2253634 | | | 5/2021 | |
| WO | 2013/087493 | | | 6/2013 | |
| WO | 2021/039413 | | | 3/2021 | |
| WO | WO-2021039413 | A1 | * | 3/2021 | F16D 65/0976 |

OTHER PUBLICATIONS

Office Action (1st) dated Jun. 1, 2026 for Chinese Patent Application No. 202310328576.X and its English translation provided by Applicant's foreign counsel.

* cited by examiner (a)

(b)

CALIPER BRAKE

CROSS-REFERENCE TO RELATED APPLICATION

This application claims the benefit of Korean Patent Application No. 10-2022-0040394, filed on Mar. 31, 2022 in the Korean Intellectual Property Office, the disclosure of which is incorporated herein by reference.

BACKGROUND

1. Field

Embodiments of the present disclosure relate to a caliper brake, and more particularly, to a caliper brake that brakes a vehicle using power from an electric motor and has a simplified component structure and appearance.

2. Description of the Related Art

Brake systems for performing braking are necessarily installed in vehicles, and various braking systems using various methods for safety of occupants and cargo have been proposed.

Among them, a caliper brake is a brake system that obtains a braking force by friction or clamping pressure between a brake disc and brake pads by bringing the brake pads into contact with both sides of the brake disc rotating together with a wheel and by pressing the brake pads against both sides of the brake disc. This caliper brake includes a caliper in which the brake pad is provided to move forward or rearward toward the brake disc while the caliper surrounds the brake pad. The caliper is provided with a cylinder and a piston, a hydraulic pressure for braking is applied to an inside of the cylinder, and thus the piston moves forward and presses the brake pad against the brake disc.

In recent years, a structure has been developed and commercialized in which an actuator including a motor and a speed reducer is applied to the caliper brake to receive the intent to brake of a driver as an electrical signal, operate an electric device such as a motor on the basis of this signal to brake, and provide a braking force for parking a vehicle and the like.

Meanwhile, in today's high-performance vehicles or luxury vehicles, monoblock calipers that have high rigidity, are resistant to heat deformation, have a beautiful appearance, and thus may improve the marketability and competitiveness of a product have been developed and applied. The monoblock caliper is not formed by coupling a plurality of components to each other as in a caliper according to the related art but is formed by integrally manufacturing a single component.

When an actuator for park braking is to be applied to such a monoblock caliper, components such as a parking piston and a parking caliper that move forward or rearward by the actuator should be additionally manufactured and mounted, and thus, manufacturing costs increase, and productivity of a product is degraded. In addition, since the monoblock caliper is precisely processed and manufactured such that one component forms one mass, manufacturing costs increase, and the manufacturing period increases.

SUMMARY

Therefore, it is an aspect of the present disclosure to provide a caliper brake in which a component structure and an appearance can be simplified.

It is another aspect of the present disclosure to provide a caliper brake in which the number of components is reduced so that manufacturing costs can be reduced and productivity can be improved.

It is still another aspect of the present disclosure to provide a caliper brake which can achieve a beautiful appearance despite the application of an actuator having a motor.

It is yet another aspect of the present disclosure to provide a caliper brake that can stably brake a vehicle even in various operating situations without installing an additional component.

It is yet another aspect of the present disclosure to provide a caliper brake which has a simple structure and thus is easily maintained.

It is yet another aspect of the present disclosure to provide a caliper brake that can reduce the size and volume of a product, thereby improving the applicability of a vehicle, and achieving space utilization of the vehicle.

It is yet another aspect of the present disclosure to provide a caliper brake that can improve the marketability and competitiveness of the vehicle.

Additional aspects of the disclosure will be set forth in part in the description which follows and, in part, will be obvious from the description, or may be learned by practice of the disclosure.

In accordance with one aspect of the present disclosure, a caliper brake includes an inner brake pad and an outer brake pad arranged on both sides of a brake disc rotating together with a wheel, a pressing member configured to press the inner brake pad toward the brake disc, a caliper housing provided such that the pressing member moves forward or rearward, a caliper bridge connected to the caliper housing and configured to press the outer brake pad toward the brake disc by a reaction force according to an operation of the pressing member, a carrier fixedly installed in a vehicle body, at least one guide rod fixedly installed in the carrier and configured to guide the sliding movement of the caliper housing and the caliper bridge relative to the carrier, and at least one outer pad spring mounted on a protrusion part formed at a side end of an outer pad plate on which the outer brake pad is fixedly installed and configured to elastically support the outer brake pad, wherein the caliper bridge includes an outer pad seat on which at least portions of the outer pad spring and the protrusion part are seated, a first torque support step protruding from an upper side of the outer pad seat and facing an upper end of the protrusion part or one side of the outer pad spring, and a second torque support step protruding from a lower side of the outer pad seat and facing a lower end of the protrusion part or the other side of the outer pad spring.

The outer pad plate may further include a restraint protrusion provided on a rear surface of the protrusion part, and the outer pad spring may include a base disposed to face the rear surface of the protrusion part, and a fastening hole which is formed through the base and which the restraint protrusion is inserted into and bound to.

A center line between the upper end and the lower end of the protrusion part may be disposed to be biased upward from a center line between an upper end and a lower end of the restraint protrusion or the fastening hole.

The restraint protrusion may be bound to the fastening hole by riveting.

The outer pad spring may further include a first support surface interposed between the upper end of the protrusion part and a lower end of the first torque support step, and a second support surface interposed between the lower end of the protrusion part and an upper end of the second torque support step.

The caliper bridge may further include, to support the outer pad spring, a first outer spring fastening groove recessed in an outer surface of the first torque support step, and a second outer spring fastening groove recessed in an outer surface of the second torque support step.

The outer pad spring may further include a first fastening portion inserted into the first outer spring fastening groove, and a second fastening portion inserted into the second outer spring fastening groove.

The first support surface may extend and be bent from an upper end of the base, and the second support surface may extend and be bent from a lower end of the base.

The first fastening portion may be bent and extend forward from a side end of the first support surface, the second fastening portion may be bent and extend forward from a side end of the second support surface, the first fastening portion may include a first fastening tab that is bent and extends inward from the first outer spring fastening groove, and the second fastening portion may include a second fastening tab that is bent and extends inward from the second outer spring fastening groove.

The caliper bridge may be provided to surround the outer brake pad and cover a front surface of the caliper housing.

The caliper bridge may include a display device, at least a portion of which is formed as a flat surface so that a logo or emblem is applied to a front surface thereof.

The caliper housing may include a guide hole formed to pass through in a forward or rearward direction, and the guide rod may be provided to extend in the forward or rearward direction and to be inserted into and pass through the guide hole.

The caliper brake may further include a restoring device configured to elastically support the caliper housing and the caliper bridge relative to the carrier in a direction in which the caliper housing and the caliper bridge return to original positions thereof, wherein the restoring device is provided on an outer surface of the guide rod.

A pair of guide rods may be provided on both sides of the pressing member with respect to an axial direction.

The restoring device may include a return spring disposed along an outer circumferential surface of the guide rod, a first support portion provided on the guide rod and configured to support one end of the return spring, and a second support portion provided on the guide rod and configured to support the other end of the return spring.

The first support portion may protrude from one side on the outer circumferential surface of the guide rod and may be provided as a retainer into which the one end of the return spring is inserted or supported thereby.

The second support portion may extend outward from the other side on the outer circumferential surface of the guide rod in a radial direction and may be provided as a support step by which the other end of the return spring is supported.

The caliper brake may further include a guide cap provided with an accommodation space in which at least portions of the guide rod and the restoring device are accommodated and configured to cover an opening at one end of the guide hole.

The caliper brake may further include at least one sealing member disposed between an outer circumferential surface of the guide rod and an inner circumferential surface of the guide hole.

The caliper bridge and the caliper housing may be coupled to each other by at least one fastening member.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
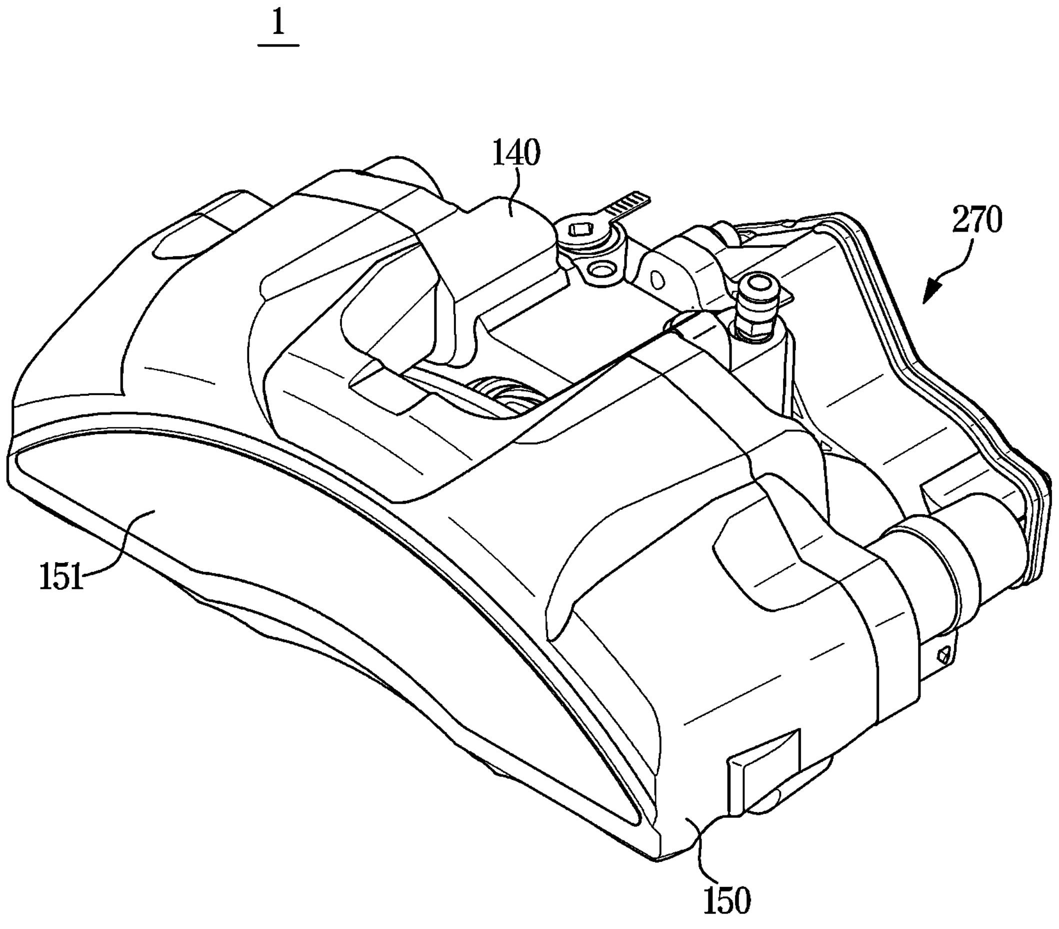
FIG. 1 is a perspective view illustrating a caliper brake according to the present embodiment.

Hereinafter, embodiments of the present disclosure will be described in detail with reference to the accompanying drawings. The following embodiments are presented to sufficiently convey the spirit of the present disclosure to those skilled in the art to which the present disclosure pertains. The present disclosure is not limited to the embodiments presented herein and may be embodied in other forms. In the drawings, illustration of components irrelevant to the description will be omitted to clarify the present disclosure, and the sizes of the components may be slightly exaggerated to help understanding.

Figure 2:
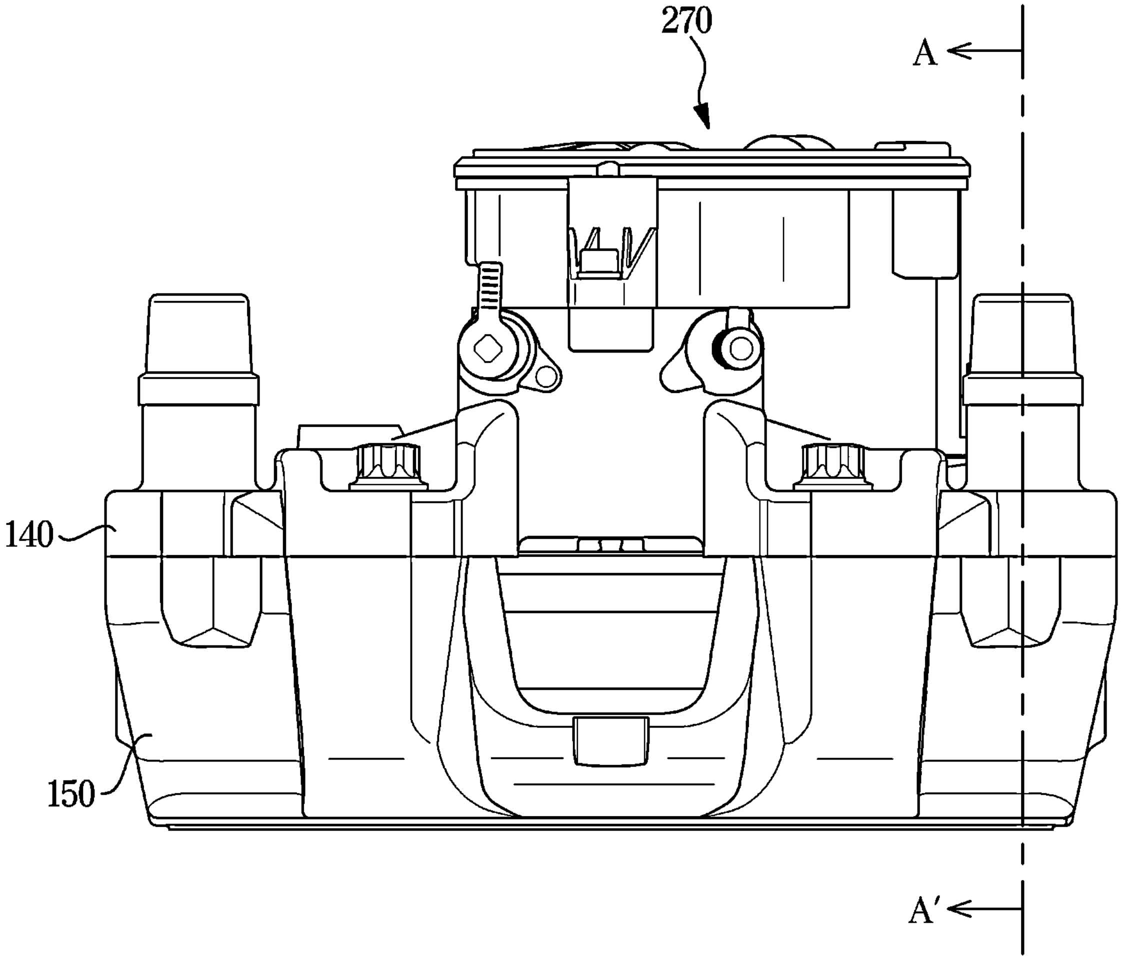
FIG. 2 is a plan view illustrating the caliper brake according to the present embodiment.
Figure 3:
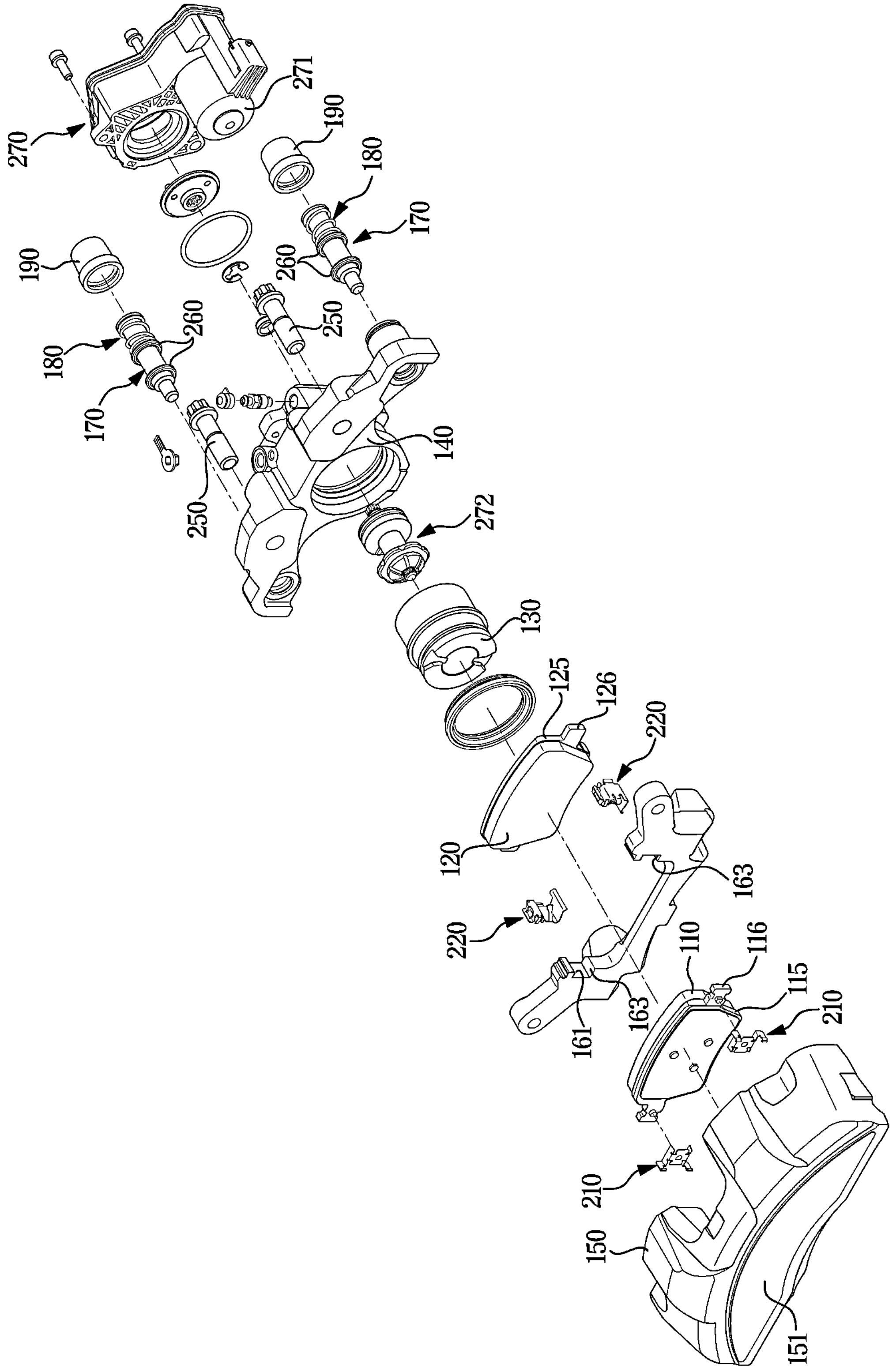
FIG. 3 is an exploded perspective view illustrating the caliper brake according to the present embodiment.
Figure 4:
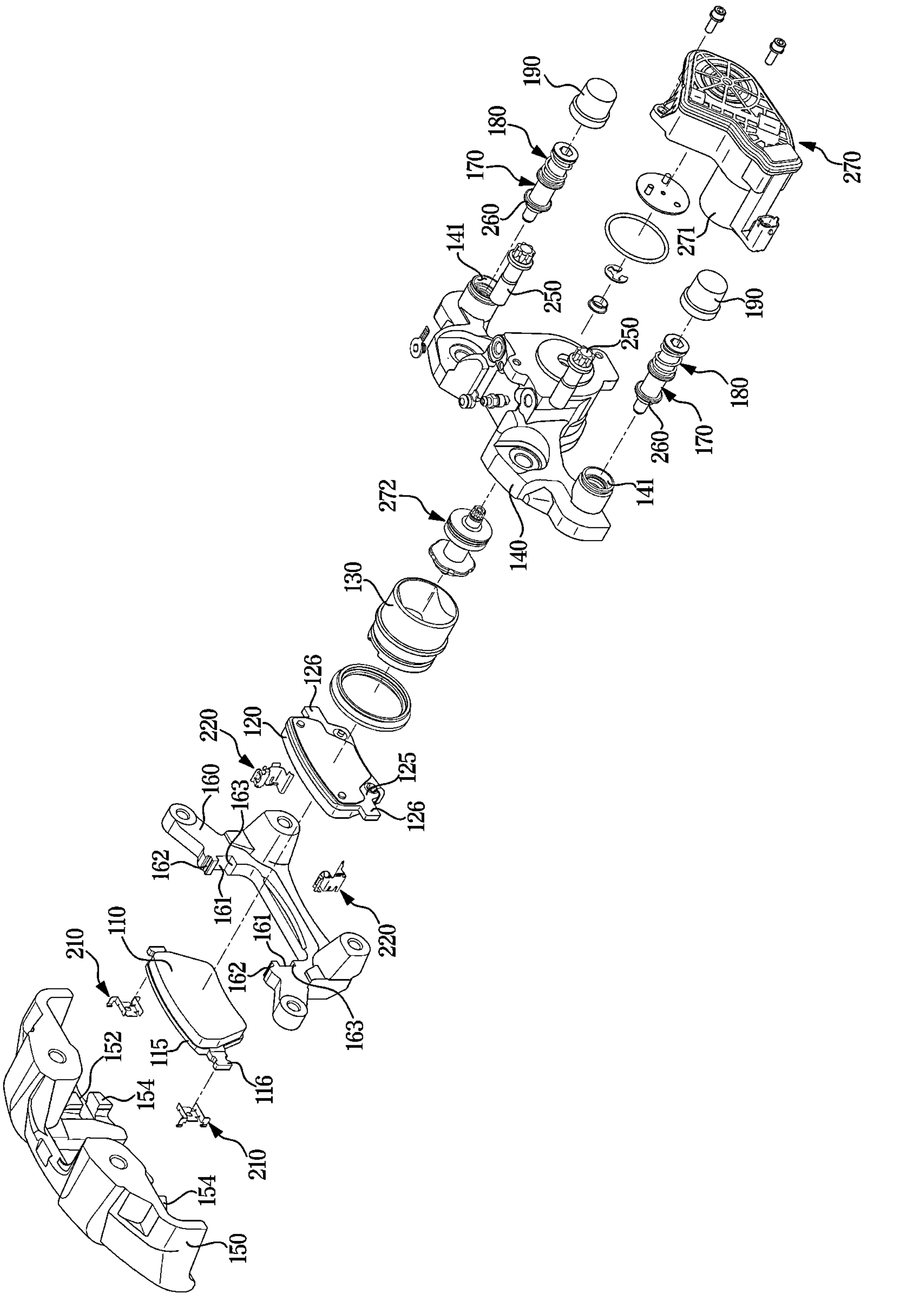
FIG. 4 is an exploded perspective view illustrating the caliper brake according to the present embodiment in a different direction.

FIG. 1 is a perspective view illustrating a caliper brake 1 according to the present embodiment, FIG. 2 is a plan view illustrating the caliper brake 1 according to the present embodiment, FIG. 3 is an exploded perspective view illustrating the caliper brake 1 according to the present embodiment in one direction, and FIG. 4 is an exploded perspective view illustrating the caliper brake 1 according to the present embodiment in another direction.

Referring to FIGS. 1 to 4, the caliper brake 1 according to the present embodiment may include a brake disc (not illustrated) that rotates together with a wheel (not illustrated) of a vehicle, a pair of brake pads 110 and 120 arranged on both sides of the brake disc, a carrier 160 fixedly installed in a vehicle body and having the inner brake pad 120 installed therein, a caliper housing 140 slidably installed on the carrier 160, a pressing member 130 installed on the caliper housing 140 to be able to move forward or rearward, a caliper bridge 150 having the outer brake pad 110 installed thereon, connected to the caliper housing 140, and provided to be slidably movable together with the caliper housing 140, a guide rod 170 fixedly installed in the carrier 160, connected to the caliper housing 140, and configured to guide the sliding movement of the caliper housing 140 and the caliper bridge 150 relative to the carrier 160, a restoring device 180 that allows the caliper housing 140 and caliper bridge 150 to return to an original position before braking or in a braking release state of the vehicle, and an actuator 270 configured to generate and provide a driving force for operating the pressing member 130.

The brake disc (not illustrated) is provided to rotate together with the wheel of the vehicle, and the inner brake pad 120 and the outer brake pad 110 are arranged on both sides of the brake disc. The inner brake pad 120 and the outer brake pad 110 are fixedly installed on an inner pad plate 125 and an outer pad plate 115, respectively, and the brake pads 110 and 120 are attached to inner surfaces (surfaces facing the brake disc) of the pad plates 115 and 125, respectively. The inner pad plate 125 is disposed such that an outer surface thereof is in contact with the pressing member 130, which will be described below, and the outer pad plate 115, along with the outer brake pad 110, is installed on a rear surface of the caliper bridge 150, which will be described below. Therefore, when the vehicle is braking, the pressing member 130 moves forward to press the inner pad plate 125 and the inner brake pad 120 toward the brake disc to bring the inner pad plate 125 and the inner brake pad 120 into close contact with the brake disc. Due to a reaction force against this, the caliper housing 140 and the caliper bridge 150 connected thereto slidably move in a direction opposite to the forward direction of the pressing member 130 with respect to the carrier 160 fixedly installed in the vehicle body. Thus, the outer pad plate 115 and the outer brake pad 110 installed in the caliper bridge 150 may be pressed toward and brought into close contact with the brake disc.

Protrusion parts 116 and 126 may be formed at both ends of the inner pad plate 125 and the outer pad plate 115, and an inner pad spring 220 and an outer pad spring 210, which will be described below, may be mounted and supported on the protrusion parts 116 and 126. A restraint protrusion **116*a* to which the outer pad spring 210, which will be described below, is bound may protrude from a rear surface of the protrusion part 116 of the outer pad plate 115, and a plurality of grooves recessed so that a portion of the inner pad spring 220, which will be described below, is stably seated thereon may be provided on the protrusion part 126 of the inner pad plate 125**. A detailed description thereof will be made below.

The pressing member 130 may be a piston and may be provided to move forward or rearward inside a cylinder provided in the caliper housing 140. The pressing member 130 may brake the vehicle by moving forward by the hydraulic pressure of a pressurized medium such as brake oil and may release the braking of the vehicle by moving rearward. Further, the pressing member 130 is operated electromechanically by the actuator 270, which will be described below, may move forward to perform the braking or parking of the vehicle, and may move rearward to release the braking or a park braking state of the vehicle.

The caliper housing 140 includes a cylinder in which a piston is disposed to move forward or rearward, and a pair of guide holes 141 formed through both sides of the cylinder in a direction parallel to the forward-rearward direction of the pressing member 130, and the caliper bridge 150 is connected to and mounted on the caliper housing 140 by a fastening member 250 to cover a front surface of the caliper housing 140. The guide rod 170, which will be described below, may be inserted into and pass through the guide holes 141, and as the guide rod 170 is fixedly installed on the carrier 160, the caliper housing 140 and the caliper bridge 150 connected thereto may slidably move in the forward-rearward direction.

Meanwhile, a front surface (front side) described in the present embodiment means an outer surface (outer side) that can be visually identified by a driver or a user from the outside of the vehicle and refers to a lower surface (lower side) with reference to FIG. 2. In contrast, a rear surface (rear side) described in the present embodiment means a side opposite to the front surface (front side) and refers to an upper surface (upper side) with reference to FIG. 2. Further, the forward-rearward direction or an axial direction described in the present embodiment means a forward or rearward direction with respect to the pressing member 130 or a direction parallel to a longitudinal axis of the pressing member 130.

The caliper bridge 150 may be connected to and mounted on the caliper housing 140 by the fastening member 250, and both the caliper bridge 150 and the caliper housing 140 may slidably move relative to the carrier 160. The outer pad plate 115 and the outer brake pad 110 may be installed on the rear surface of the caliper bridge 150, and a display device 151 to which a logo or emblem of a product or vehicle may be applied may be provided on a front surface of the caliper bridge 150. The display device 151 may be provided by forming at least a portion of the front surface of the caliper bridge 150 as a flat surface.

As the caliper bridge 150 is connected to and mounted on the caliper housing 140, when the caliper housing 140 slidably moves relative to the carrier 160 by the guide rod 170, which will be described below, the caliper bridge 150 may also slidably move. Thus, when the vehicle is braking, the caliper housing 140 and the caliper bridge 150 slidably move together in a direction opposite to the movement direction of the pressing member 130 by a reaction force caused by the forward movement of the pressing member 130, and thus the outer brake pad 110 installed in the caliper bridge 150 may be pressed toward and brought into contact with the brake disc. In contrast, when the braking of the vehicle is released, the caliper housing 140 returns to an original position by the restoring device 180, which will be described below, the caliper bridge 150 connected to the caliper housing 140 also moves to an original position, and thus the outer brake pad 110 installed in the caliper bridge 150 may be spaced apart from the brake disc.

Further, the caliper bridge 150 may be provided to cover the front surface of the caliper housing 140, thereby forming the appearance of the product. The caliper bridge 150 is provided to surround various components such as the brake pads 110 and 120 and the pad plates 115 and 125 arranged therein and cover the front surface of the caliper housing 140 so that the appearance of the product which is viewed from the outside of the wheel or vehicle is made beautiful. In particular, today, the appearances of the caliper viewed from the outside and the wheel applied to high-performance vehicles or luxury vehicles are very important purchasing decision factors for consumers. Accordingly, the caliper bridge 150 is provided to cover the front surface of the caliper housing 140 while surrounding various components, and at the same time, the display device 151 that may display a brand of the product or vehicle is provided on the front surface of the caliper bridge 150. Thus, the marketability and competitiveness of the product and an applied vehicle can be improved.

The caliper bridge 150 may be manufactured by a molding process of injecting a casting into a mold, and the mold may be provided with a cavity corresponding to the shape of the caliper bridge 150 between a pair of molds provided to be divided in a horizontal direction. When the caliper bridge 150 is manufactured, a runner into which the casing is input may be disposed on a rear side of the mold so that an additional processing for the display device 151 to which the logo or emblem of the product or vehicle is applied may be omitted. Therefore, a manufacturing process can be simplified, and at the same time, manufacturing costs can be reduced.

A detailed description of the outer brake pad 110, the outer pad plate 115, and the outer pad spring 210 mounted on the rear surface of the caliper bridge 150 will be made below with reference to FIGS. 9 to 15.

The carrier 160 may be fixedly installed on a supportable fixture such as a vehicle body by a bolt 169 or the like. The guide rods 170, which will be described below, may be fixedly installed on both sides of the carrier 160, and therefore, fasteners to which the guide rods 170 are screw-fastened may pass through both sides of the carrier 160 in the forward or rearward direction or may be recessed in the rear surface of the carrier 160. To this end, a screw thread may be formed on an inner circumferential surface of the fastener. Further, the inner pad plate 125 and the inner brake pad 120 may be installed at a central portion of the carrier 160 close to the pressing member 130, and the inner pad spring 220 may be mounted between the inner protrusion part 126 of the inner pad plate 125 and the carrier 160. A detailed description of the inner brake pad 120, the inner pad plate 125, and the inner pad spring 220 mounted on the central portion of the carrier 160 will be made below with reference to FIGS. 16 to 20.

Figure 5:
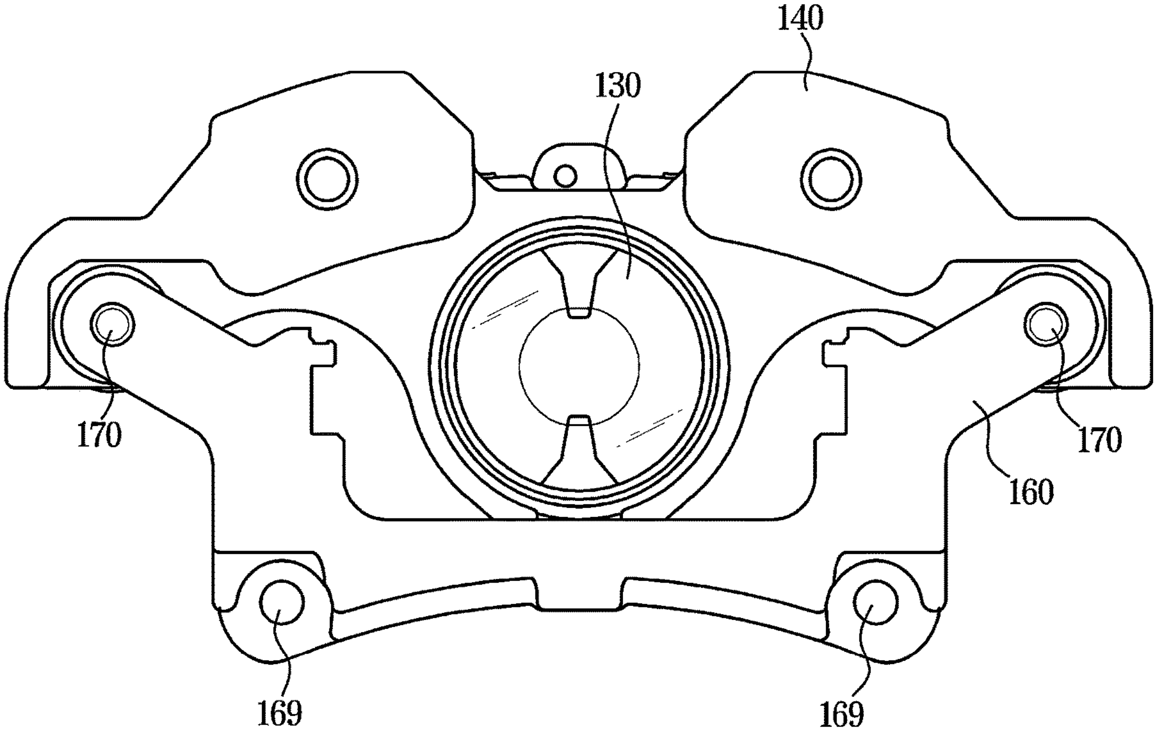
FIG. 5 is a front view illustrating a pressing member, a caliper housing, a carrier, and a guide rod according to the present embodiment.
Figure 6:
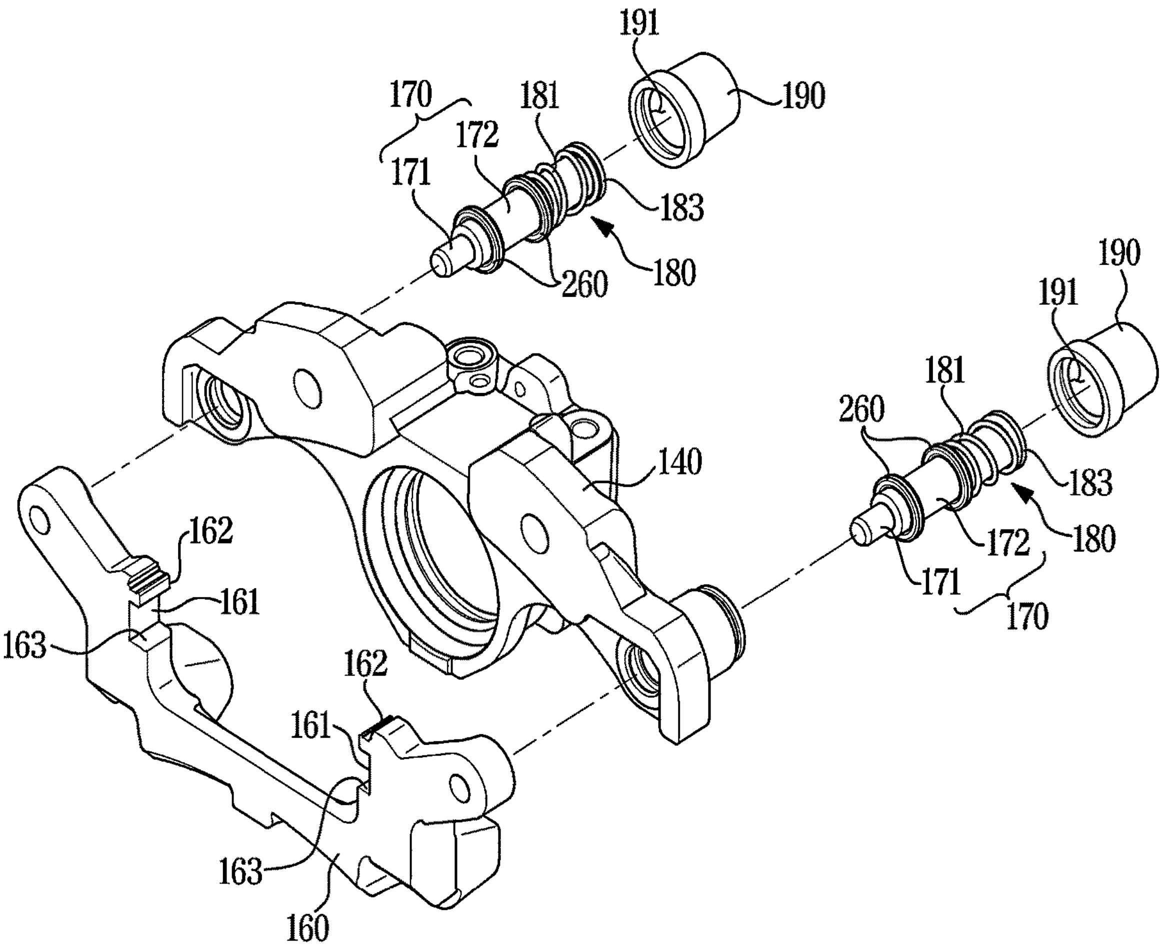
FIG. 6 is an exploded perspective view illustrating the guide rod and a restoring device according to the present embodiment.
Figure 7:
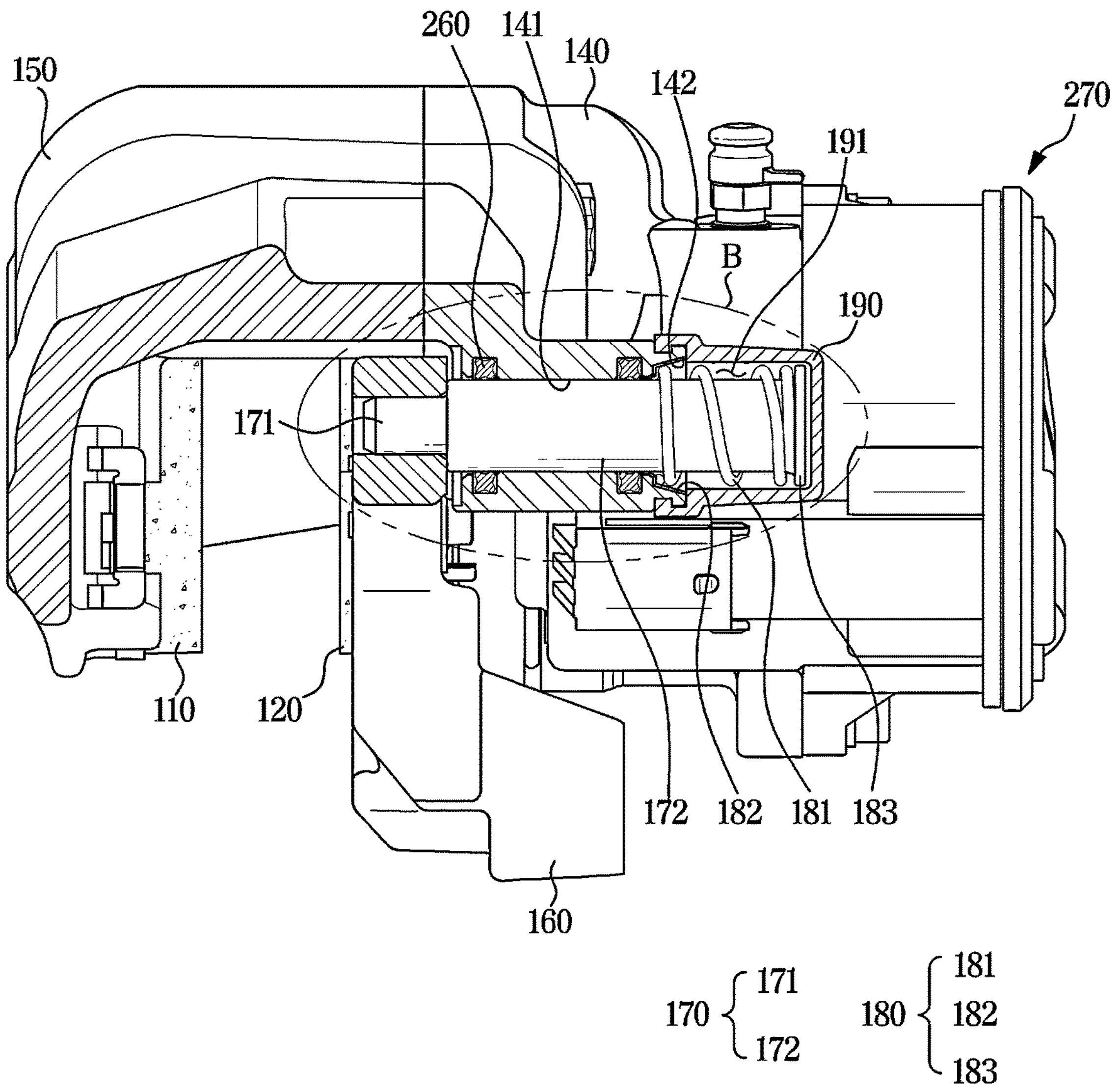
FIG. 7 is a cross-sectional view along line A-A' of FIG. 2 and a cross-sectional view illustrating the guide rod and the restoring device according to the present embodiment.
Figure 8:
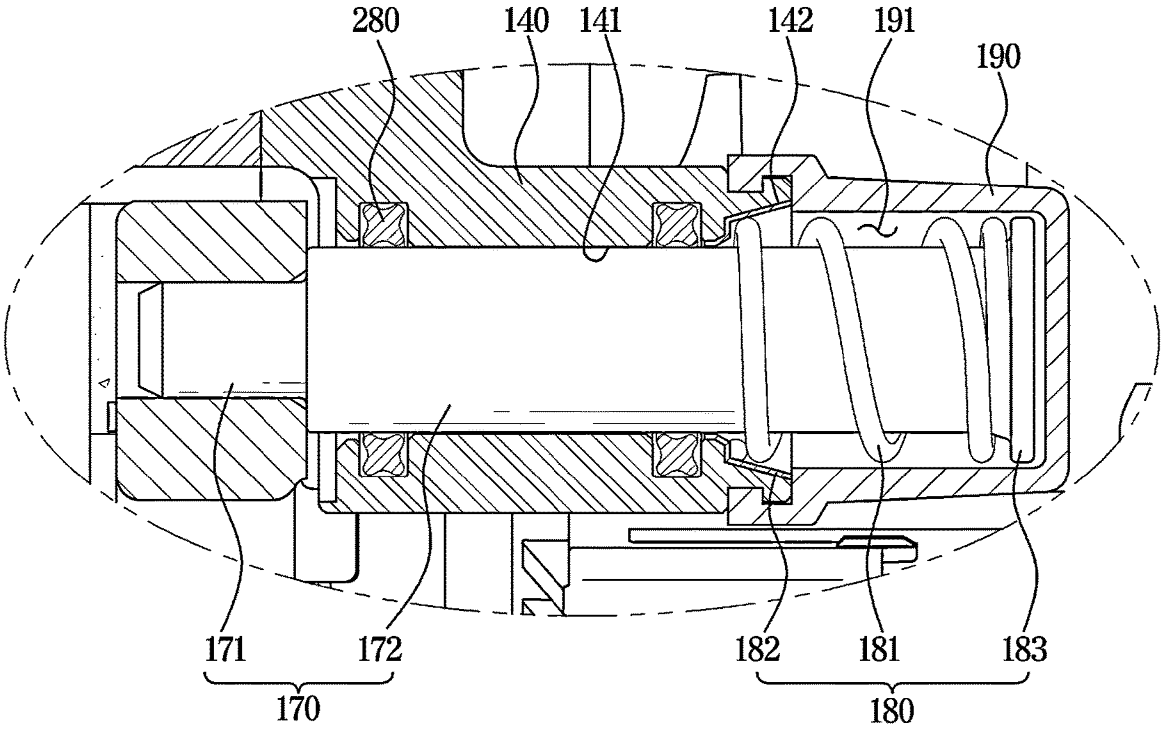
FIG. 8 is an enlarged view illustrating part B of FIG. 7.

FIG. 5 is a front view illustrating the pressing member 130, the caliper housing 140, the carrier 160, and the guide rod 170 according to the present embodiment, FIG. 6 is an exploded perspective view illustrating the guide rod 170 and the restoring device 180 according to the present embodiment, FIG. 7 is a cross-sectional view along line A-A' of FIG. 2, and FIG. 8 is an enlarged view illustrating part B of FIG. 7.

Referring to FIGS. 3 to 8, the guide rods 170 are fixedly installed on both sides of the carrier 160 and are provided to guide the sliding movement of the caliper housing 140 and the caliper bridge 150 relative to the carrier 160. Further, the restoring device 180 is disposed outside the guide rod 170 and provided to allow the caliper housing 140 and the caliper bridge 150 to return to the original positions thereof before the braking or in the braking release state.

The guide rod 170 may be provided in a cylindrical shape extending in the forward or rearward direction. One side of the guide rod 170 may be fixedly installed by being inserted into and fastened to the fastener of the carrier 160, and the other side thereof may be disposed to be inserted into and pass through the guide hole 141 formed through the caliper housing 140 in the forward or rearward direction. The guide rod 170 is fixedly installed in the carrier 160, the guide rod 170 is maintained at one position together with the carrier 160, the caliper housing 140 and the caliper bridge 150 move forward or rearward along the guide rod 170 when the vehicle is braking or the braking is released, and thus the sliding movement can be guided.

As illustrated in FIG. 5, the guide rods 170 may be provided on both sides of the pressing member 130 with respect to an axial direction of the pressing member 130. When the brake disc and the brake pad are in close contact with each other for braking the vehicle, loads may be applied to various components such as the caliper housing 140 and the caliper bridge 150 by the rotating wheel and the rotating brake disc, and accordingly, there is a concern that various components such as the caliper housing 140 and the caliper bridge 150 may be deformed. Accordingly, since the guide rods 170 and the guide holes 141 are provided on both sides of the pressing member 130, the forward or rearward movement of the caliper housing 140 and the caliper bridge 150 can be stably guided despite the load applied during the braking. It is illustrated in the drawing that the pair of guide rods 170 are symmetrically provided on both sides of the pressing member 130, but the present disclosure is not limited to the corresponding position and number, and the number and position may variously change depending on the weight of the vehicle and the capacity of the brake disc.

At least one sealing member 260 configured to prevent the inflow of foreign substances may be interposed between an outer circumferential surface of the guide rod 170 and an inner circumferential surface of the guide hole 141, and the sealing member 260 is seated and provided on an accommodation groove recessed in the inner circumferential surface of the guide hole 141. However, unlike the illustration of FIGS. 7 and 8, it should be understood in the same way even when the accommodation groove is recessed in the outer circumferential surface of the guide rod 170 and the sealing member 260 is inserted and seated therein.

The guide rod 170 may include a core portion 171 inserted into and fastened to the fastener of the carrier 160 and a bush portion 172 inserted into and passing through the guide hole 141 and facing the inner circumferential surface of the guide hole 141. The core portion 171 may be made of a material having high rigidity and may be coupled to the carrier 160 through screw fastening so that the guide rod 170 is firmly and fixedly supported by the carrier 160. To this end, a screw thread may be formed on an outer circumferential surface of a front end of the core portion 171. However, the present disclosure is not limited thereto, and the core portion 171 may be firmly coupled to the carrier 160 through press fitting or welding. Further, as the vehicle brakes repeatedly, a lot of contact and friction occurs between an outer circumferential surface of the bush portion 171 and the inner circumferential surface of the guide hole 141, and thus the bush portion 172 may be made of a material resistant to abrasion. That is, the core portion 171 and the bush portion 172 are manufactured as two components having different materials and then assembled with each other. However, the present disclosure is not limited thereto, and the guide rod 170 may be integrally manufactured and provided with a single material that has stable rigidity and is resistant to abrasion.

The restoring device 180 is provided to elastically support the caliper housing 140 and the caliper bridge 150 in a direction in which the caliper housing 140 and the caliper bridge 150 return to the original positions thereof.

Referring to FIGS. 6 to 8, the restoring device 180 may be provided on an outer surface of the guide rod 170. The restoring device 180 may include a return spring 181 disposed along the outer circumferential surface of the guide rod 170 and a first support portion and a second support portion provided on the guide rod 170 and configured to support one end and the other end of the return spring 181.

The return spring 181 may be disposed on the outer circumferential surface of the guide rod 170 on a rear side. As an example, as illustrated in FIGS. 6 to 8, the return spring 181 may be provided as a coil spring to surround the outer circumferential surface of the guide rod 170, but the present disclosure is not limited to the corresponding structure, and the return spring 181 may be made of various materials as long as the return spring 181 may be disposed on the outer circumferential surface of the guide rod 170.

The one end of the return spring 181 may be supported by the first support portion. In detail, a front end of the return spring 181 may be supported by the first support portion, and the first support portion may be provided as a retainer 182 mounted on the outer circumferential surface of the guide rod 170. The retainer 182 may be provided in a cylindrical shape having an empty inside, an outer diameter of the retainer 182 may be formed to be greater than an outer diameter of the guide rod 170 and the return spring 181, the front end of the retainer 182 may be contracted inward in a radial direction and may be in close contact with and fixed to the outer circumferential surface of the guide rod 170, and the one end of the return spring 181 may be inserted into or supported by the front end of the retainer 182. Further, the retainer 182 extends outward in the radial direction toward the rear side, and the one end of the return spring 181 may be smoothly enter the inside of the retainer 182. The retainer 182 may be inserted into and installed in a mounting hole 142 recessed in a rear opening of the guide hole 141.

The other end of the return spring 181 may be supported by the second support portion. In detail, a rear end of the return spring 181 may be supported by the second support portion, and the second support portion may be provided as a support step 183 extending outward in the radial direction from a rear end of the outer circumferential surface of the guide rod 170. The support step 183 may be provided integrally with the guide rod 170 and is formed to extend outward from an outer circumferential surface of the bush portion 172, and thus the other end of the return spring 181 may be in contact with and supported by a front surface of the support step 183.

An opening in the rear surface of the guide hole 141 may be sealed by a guide cap 190. The guide cap 190 is provided with an accommodation space 191 therein in which the rear end of the guide rod 170 and at least a portion of the restoring device 180 are accommodated and may be mounted as a front end of the guide cap 190 is fastened to the caliper housing 140. To this end, a step protruding inward may be provided on an inner circumferential surface of the guide cap 190, a groove into which the step of the guide cap 180 is inserted and fastened may be formed around the opening in the rear surface of the guide hole 141 of the caliper housing 140. Since the opening in the rear surface of the guide hole 141 is covered by the guide cap 190, the inflow of foreign substances can be prevented, and when the guide rod 170 and the restoring device 180 operate, interference with external components can be prevented, and stable operation can be achieved.

Hereinafter, a structure in which the outer brake pad 110 is mounted on the caliper bridge 150 by the outer pad spring 210 will be described.

Figure 9:
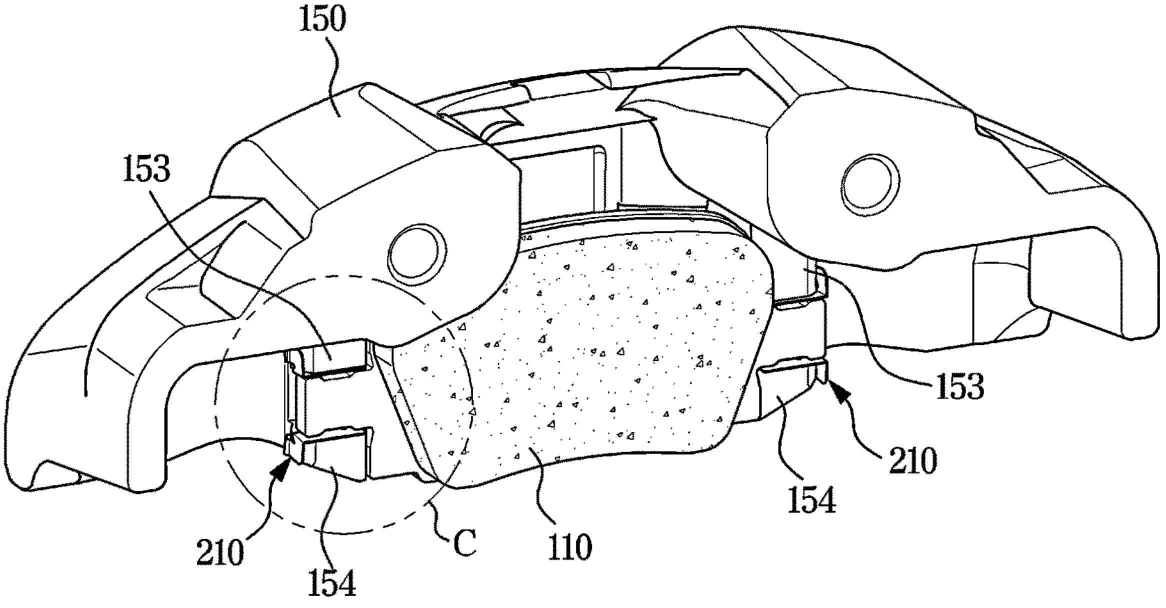
FIG. 9 is a perspective view illustrating a caliper bridge, an outer brake pad, and an outer pad spring according to the present embodiment.
Figure 10:
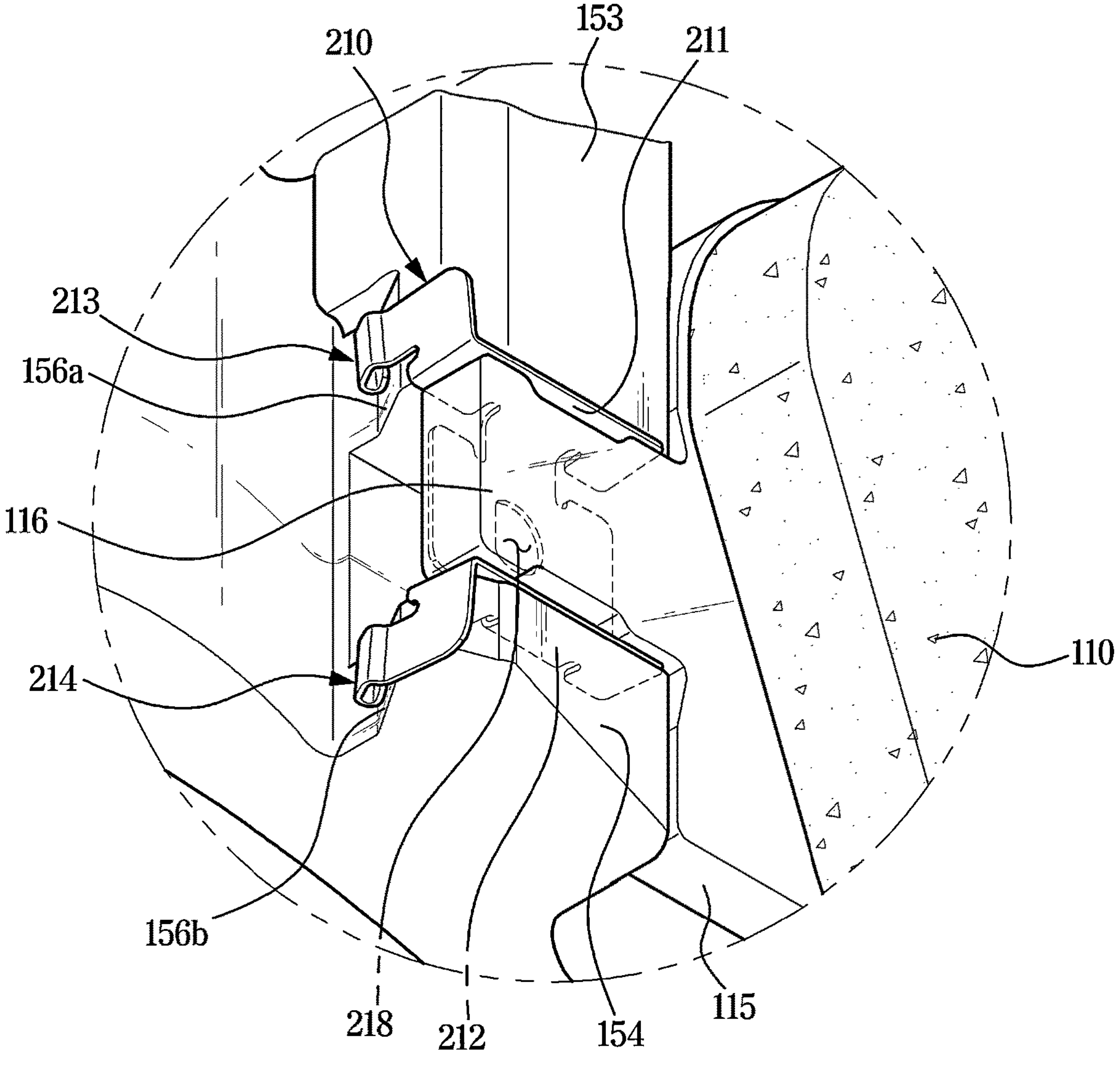
FIG. 10 is an enlarged view illustrating part C of FIG. 9.
Figure 11:
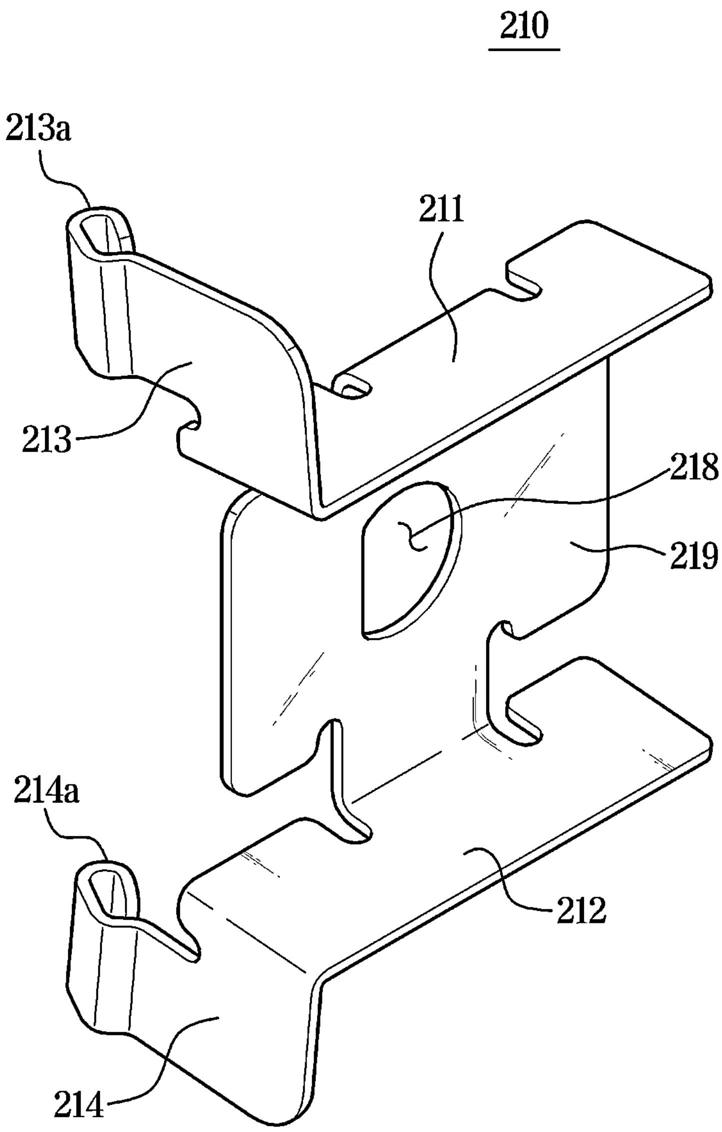
FIG. 11 is a perspective view illustrating the outer pad spring according to the present embodiment.
Figure 12:
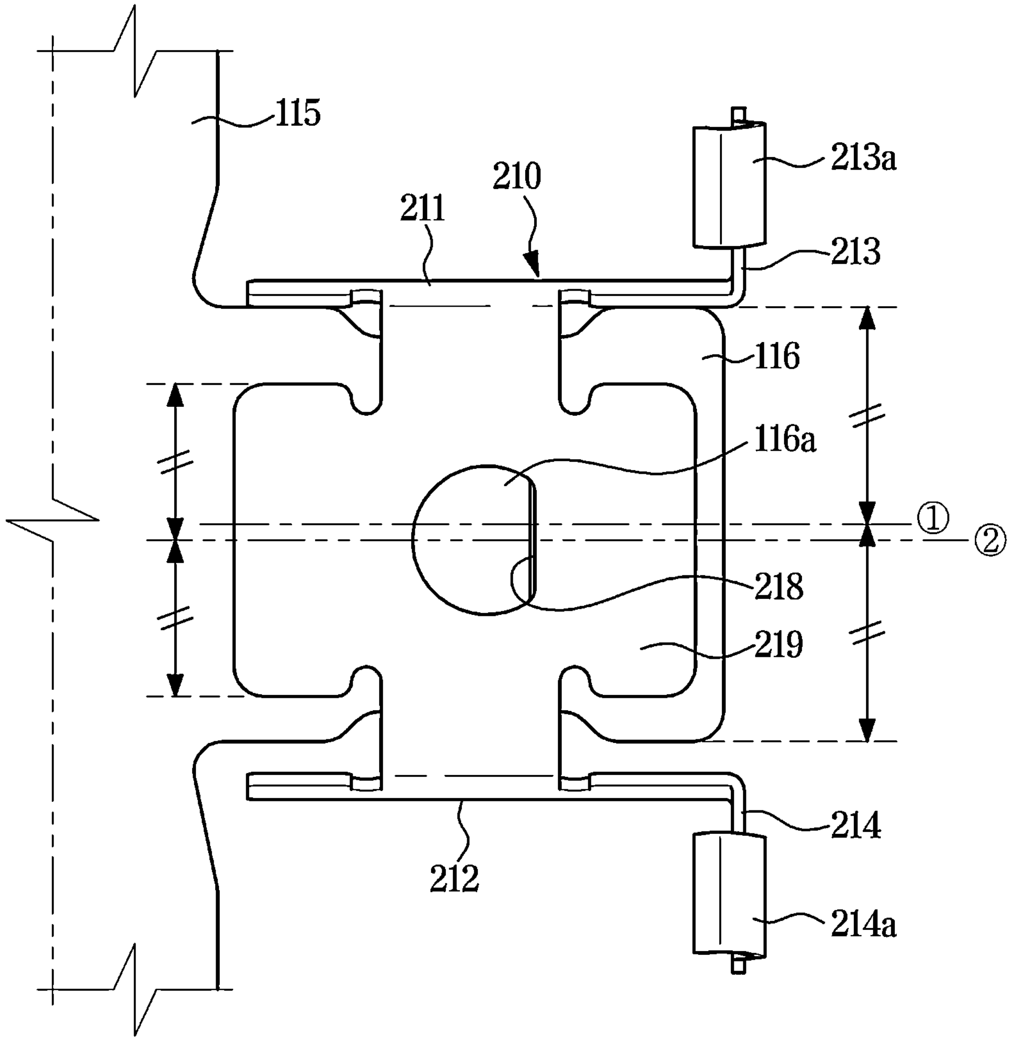
FIG. 12 is a view illustrating a state in which the outer pad spring is mounted on a protrusion part of an outer pad plate according to the present embodiment.
Figure 13:
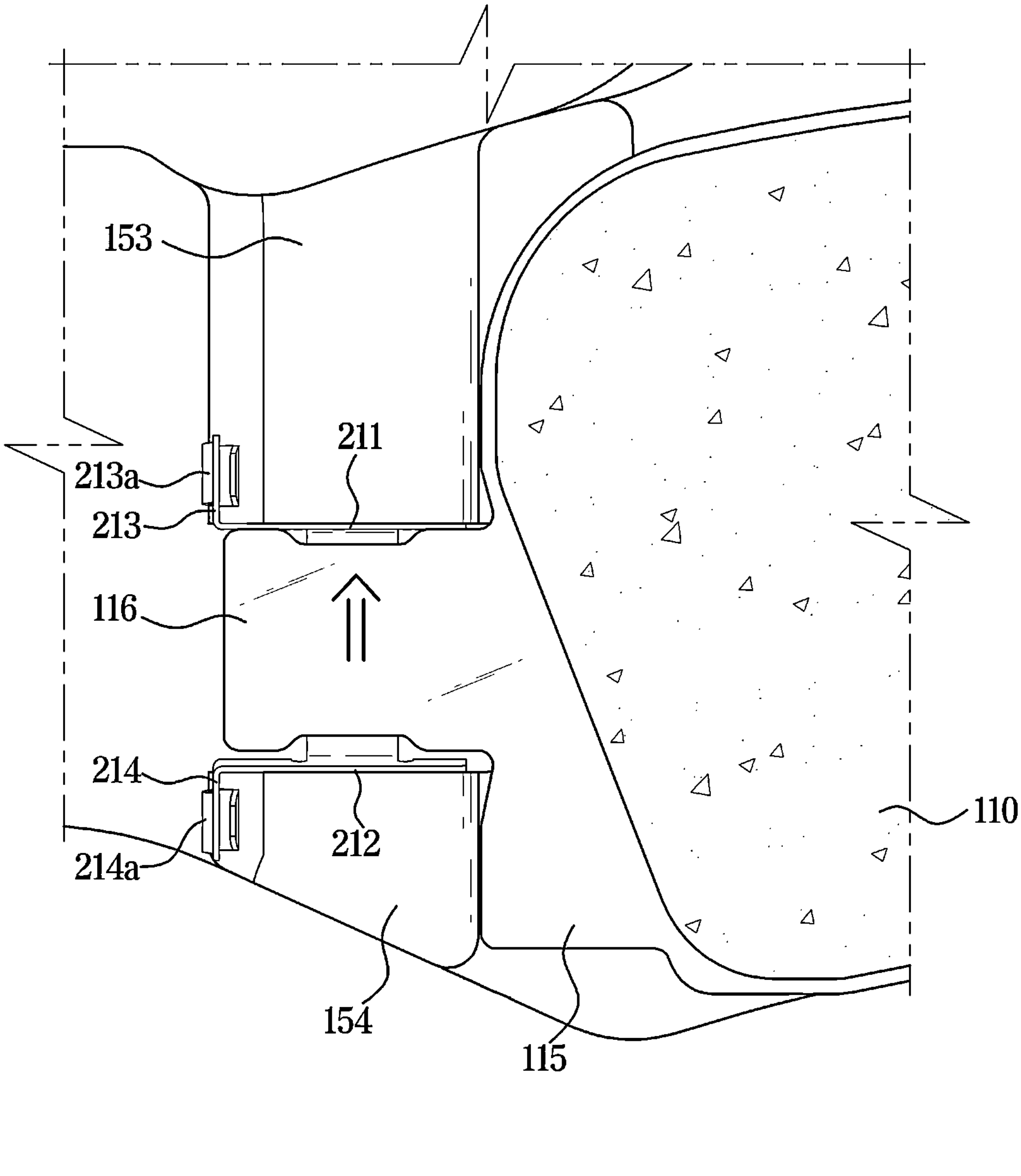
FIG. 13 is a view illustrating a state in which the outer brake pad, the outer pad plate, and the outer pad spring are mounted on an outer pad seat of the caliper bridge according to the present embodiment.

FIG. 9 is a perspective view illustrating a caliper bridge 150, an outer brake pad 110, and an outer pad spring 210 according to the present embodiment, and FIG. 10 is an enlarged view illustrating part C of FIG. 9. Further, FIG. 11 is a perspective view illustrating the outer pad spring 210 according to the present embodiment, FIG. 12 is a view illustrating a state in which the outer pad spring 210 is mounted on a protrusion part 116 of an outer pad plate 115 according to the present embodiment, and FIG. 13 is a view illustrating a state in which the outer brake pad 110, the outer pad plate 115, and the outer pad spring 210 are mounted on an outer pad seat 152 according to the present embodiment.

Referring to FIGS. 9 to 13, the outer pad spring 210 is provided to elastically support the outer brake pad 110 and the outer pad plate 115 on the rear surface of the caliper bridge 150. The outer pad spring 210 seats and supports the outer protrusion part 116 formed at a side end of the outer pad plate 115 on the outer pad seat 152 formed on the rear surface of the caliper bridge 150 so that the outer brake pad 110 can be mounted and installed on the caliper bridge 150.

The outer pad seat 152 is formed on the rear surface of the caliper bridge 150 to be recessed from a peripheral portion so that at least portions of the outer pad spring 210 and the outer protrusion part 116 can be inserted and supported, a first torque support step 153 may protrude from an upper side of the outer pad seat 152, and a second torque support step 154 may protrude from a lower side of the outer pad seat 152. Further, first and second outer spring fastening grooves **156*a* and 156*b* into which first and second fastening portions 213 and 214 of the outer pad spring 210, which will be described below, are inserted may be recessed in outer surfaces of the first torque support step 153 and the second torque support step 154. Therefore, the outer pad spring 210 can be firmly supported on the caliper bridge 150, and at the same time, the outer pad spring 210 can be effectively prevented from being separated from the caliper bridge 150**.

The outer pad seat 152 is formed on the rear surface of the caliper bridge 150 but is not through-formed or perforated and thus may not be exposed to the front surface of the caliper bridge 150 forming the appearance of the caliper brake 1. Further, when the brake disc and the brake pad are in close contact with each other by the first torque support step 153 and the second torque support step 154 protruding rearward from the upper side and the lower side of the outer pad seat 152, the outer pad plate 115 and the outer brake pad 110 can be stably supported despite the load applied by the rotating wheel and the rotating brake disc. A detailed description thereof will be made below with reference to FIGS. 14 and 15.

A pair of outer pad springs 210 may be provided on both sides of the outer pad plate 115. Referring to FIGS. 9 to 13, the outer pad spring 210 may include a base 219, a first support surface 211 provided on an upper side of the base 219 and interposed between the first torque support step 153 and the outer protrusion part 116, a second support surface 212 provided on a lower side the base 219 and interposed between the second torque support step 154 and the outer protrusion part 116, the first and second fastening portions 213 and 214 provided at an outer end of the base 219 and inserted into the first and second outer spring fastening grooves 156*a* and 156*b* to stably support the outer pad spring 210 on the caliper bridge 150, and a fastening hole 218 which is formed through the base 219 and into which the restraint protrusion 116*a* is inserted and bound to stably support the outer pad spring 210 on the outer protrusion part 116 of the outer pad plate 115.

The base 219 forms a body and is provided to face or be in contact with the rear surface of the outer protrusion part 116 of the outer pad plate 115. The base 219 is provided in a plate shape, the fastening hole 218 into which a restraint protrusion 116*a* protruding from a rear surface of the outer protrusion part 116 is inserted may be formed through the base 219, and the first support surface 211, the first fastening portion 213, the second support surface 212, and the second fastening portion 214, which will be described below, may be continuously cut and bent at upper and lower ends of the base 219. In other words, the outer pad spring 210 may be integrally provided as a single body and manufactured by cutting and bending the first support surface 211, the second support surface 212, the first fastening portion 213, the second fastening portion 214, and the fastening hole 218 from the base 219, and accordingly, a structure and a manufacturing process can be simplified.

The first support surface 211 may be interposed between an upper end of the outer protrusion part 116 and a lower end of the first torque support step 153 to elastically support the outer protrusion part 116 on the first torque support step 153. In detail, the first support surface 211 may be formed by extending and being bent forward from the upper end of the base 219 along the upper end of the outer protrusion part 116. Therefore, an upper surface of the first support surface 211 is disposed to be in contact with the lower end of the first torque support step 153 so that the outer protrusion part 116 of the outer pad plate 115 may be elastically supported on the first torque support step 153 by the first support surface 211. Furthermore, it is apparent that the first support surface 211 can reduce the wear, damage, or noise caused by direct contact between the outer pad plate 115 and the first torque support step 153.

The first fastening portion 213 may extend and be bent from the first support surface 211 to stably fasten and support the outer pad spring 210 on the caliper bridge 150. In detail, the first fastening portion 213 may extend from a side end of the first support surface 211, and a first fastening tab 213*a* inserted into and mounted on the first outer spring fastening groove 156*a* recessed in an outer surface of the first torque support step 153 may be cut and bent at an end of the first fastening portion 213. The first fastening tab 213*a* extends toward the inside of the first outer spring fastening groove 156*a* and is inserted into and mounted on the first outer spring fastening groove 156*a* so that the outer pad spring 210 may be stably fastened and supported on the caliper bridge 150.

The second support surface 212 may be interposed between a lower end of the outer protrusion part 116 and an upper end of the second torque support step 154 to elastically support the outer protrusion part 116 on the second torque support step 154. In detail, the second support surface 212 may be formed by extending and being bent forward from the lower end of the base 219 along the lower end of the outer protrusion part 116. Therefore, a lower surface of the second support surface 212 is disposed to be in contact with the upper end of the first torque support step 154 so that the outer protrusion part 116 of the outer pad plate 115 may be elastically supported on the second torque support step 154 by the second support surface 212. Further, like the first support surface 211, the second support surface 212 may be interposed between the outer pad plate 115 and the second torque support step 154 to reduce the wear, damage, or noise caused by direct contact between the outer pad plate 115 and the second torque support step 154.

The second fastening portion 214 may extend and be bent from the second support surface 212 to stably fasten and support the outer pad spring 210 on the caliper bridge 150. In detail, the second fastening portion 214 may extend from a side end of the second support surface 212, and a second fastening tab 214*a* inserted into and mounted on the second outer spring fastening groove 156*b* recessed in an outer surface of the second torque support step 154 may be cut and bent at an end of the second fastening portion 214. The second fastening tab 214*a* extends toward the inside of the second outer spring fastening groove 156*b* and is inserted into and mounted on the second outer spring fastening groove 156*b* so that the outer pad spring 210 may be stably fastened and supported on the caliper bridge 150.

The base 219 may be mounted on and supported by the outer protrusion part 116 of the outer pad plate 115 through the fastening hole 218. Referring to FIG. 12, the fastening hole 218 may be formed through the base 219 so that the restraint protrusion 116*a* protruding from the rear surface of the outer protrusion part 116 is inserted thereinto, and the restraint protrusion 116*a* is inserted into and bound to the fastening hole 218 so that the outer pad spring 210 may be mounted on and bound to the outer pad plate 115. Further, the restraint protrusion 116*a* may be firmly bound and fixed to the fastening hole 218 by riveting.

Meanwhile, when the outer brake pad 110 and the outer pad plate 115 are mounted on the caliper bridge 150, the outer brake pad 110 and the outer pad plate 115 are assembled in close contact with the first torque support step 153, and thus a gap between components can be prevented, and the load applied by the rotating brake disc can be effectively withstood. To this end, a horizontal center line of the restraint protrusion 116*a* or the fastening hole 218 may be disposed to be biased downward from a horizontal center line of the outer protrusion part 116. In detail, as illustrated in FIG. 12, a center line ① between the upper end and the lower end of the outer protrusion part 116 may be disposed to be biased upward from a center line ② between the upper end and the lower end of the restraint protrusion 116*a* or the fastening hole 218, which is a reference for an assembling position of the outer pad spring 210. Accordingly, when the outer pad plate 115 and the outer pad spring 210 are assembled into one assembly and are then mounted on the outer pad seat 152 of the caliper bridge 150, as illustrated in FIG. 13, the outer protrusion part 116 may be mounted to be biased upward, and thus may be assembled in close contact with the first torque support step 153.

The first torque support step 153 and the second torque support step 154 protrude from the rear surface of the caliper bridge 150, and thus allow the outer pad seat 152 to be formed therebetween, and withstand the load applied by the rotating brake disc.

Figure 14:
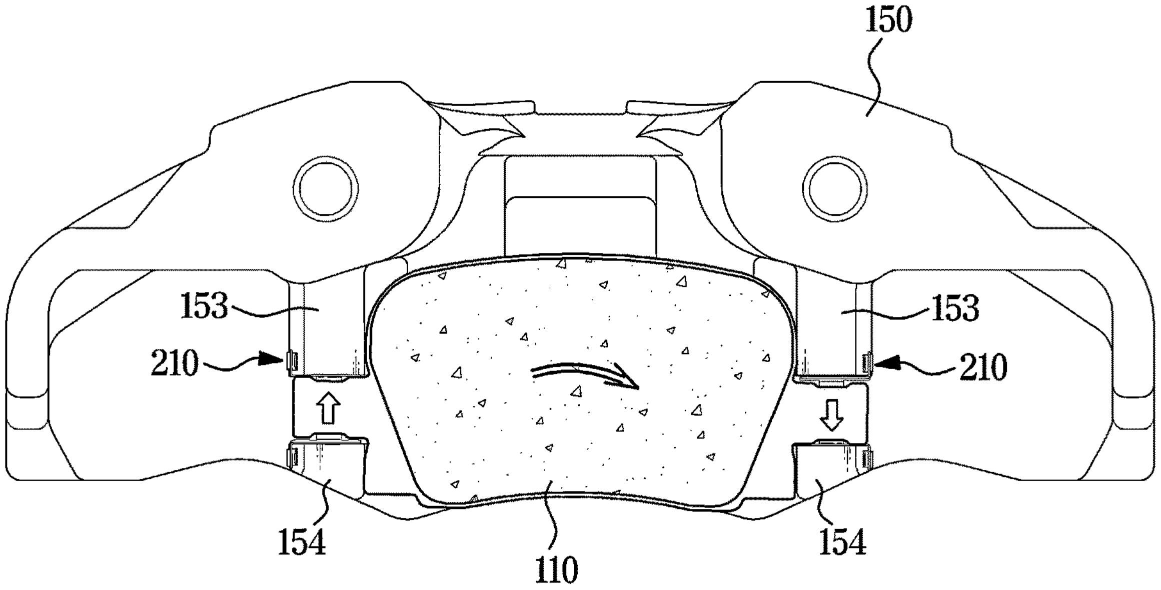
FIG. 14 is a rear view illustrating the caliper bridge, the outer brake pad, and the outer pad spring according to the present embodiment and a view illustrating a state in which a load applied in one direction is supported.
Figure 15:
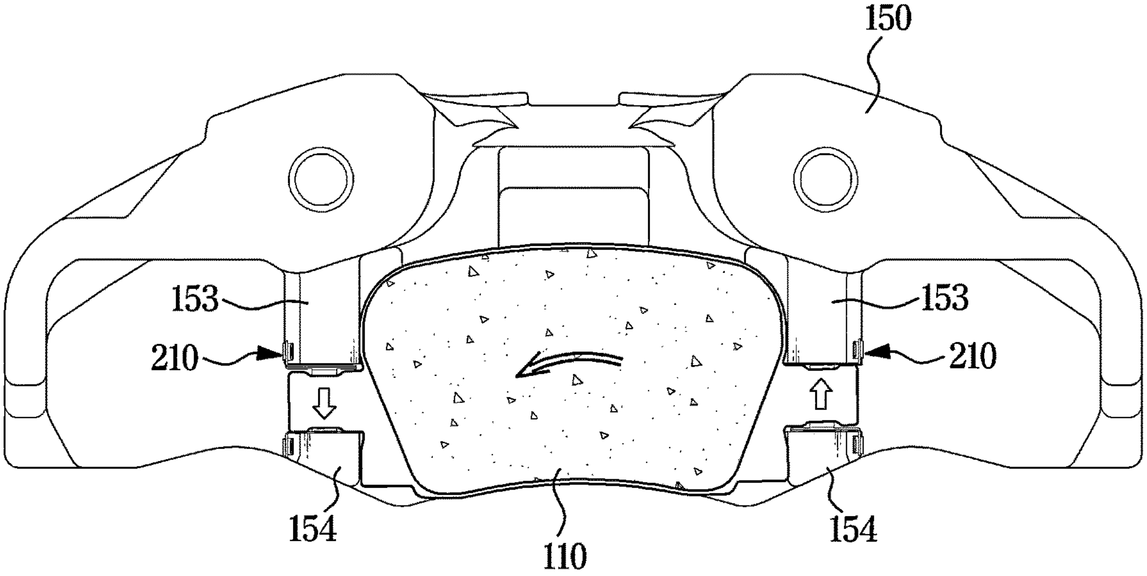
FIG. 15 is a rear view illustrating the caliper bridge, the outer brake pad, and the outer pad spring according to the present embodiment and a view illustrating a state in which a load applied in the other direction is supported.

FIGS. 14 and 15 are rear views illustrating the caliper bridge 150, the outer brake pad 110, and the outer pad spring 210 according to the present embodiment and illustrate an operating state in which the load is supported by the first torque support step 153 and the second torque support step 154.

Referring to FIGS. 14 and 15, the first torque support step 153 may protrude from an upper side of the outer pad seat 152, and the second torque support step 154 may protrude from a lower side of the outer pad seat 152. That is, the first torque support step 153 and the second torque support step 154 may relatively protrude with respect to the outer pad seat 152, and the outer pad seat 152 may be relatively recessed with respect to the first torque support step 153 and the second torque support step 154. Accordingly, the first torque support step 153 may face the upper end of the outer protrusion part 116 or the first support surface 211 of the outer pad spring 210, and the second torque support step 154 may face the lower end of the outer protrusion part 116 or the second support surface 212 of the outer pad spring 210.

When the brake disc and the outer brake pad 110 are in close contact with each other for braking the vehicle in a state in which the wheel and the brake disc rotate in one direction (clockwise direction in FIG. 14), a load is generated in the outer pad plate 115 and the outer brake pad 110 in the same direction as the rotational direction of the brake disc. In this case, the first torque support step 153 on one side (left side in FIG. 14) and the second torque support step 154 on the other side (right side in FIG. 14) may stably support a load applied to the outer pad plate 115 and thus may maintain a constant braking force for the vehicle despite the load.

In contrast, when the brake disc and the outer brake pad 110 are in close contact with each other for braking the vehicle in a state in which the wheel and the brake disc rotate in the other direction (counterclockwise direction in FIG. 15), a load is generated in the outer pad plate 115 and the outer brake pad 110 in the same direction as the rotational direction of the brake disc. In this case, the second torque support step 154 on one side (left side in FIG. 15) and the first torque support step 153 on the other side (right side in FIG. 15) may stably support the load applied to the outer pad plate 115 and thus may maintain a constant braking force for the vehicle.

Hereinafter, a structure in which the inner brake pad 120 is mounted on the carrier 160 by the inner pad spring 220 will be described.

Figure 16:
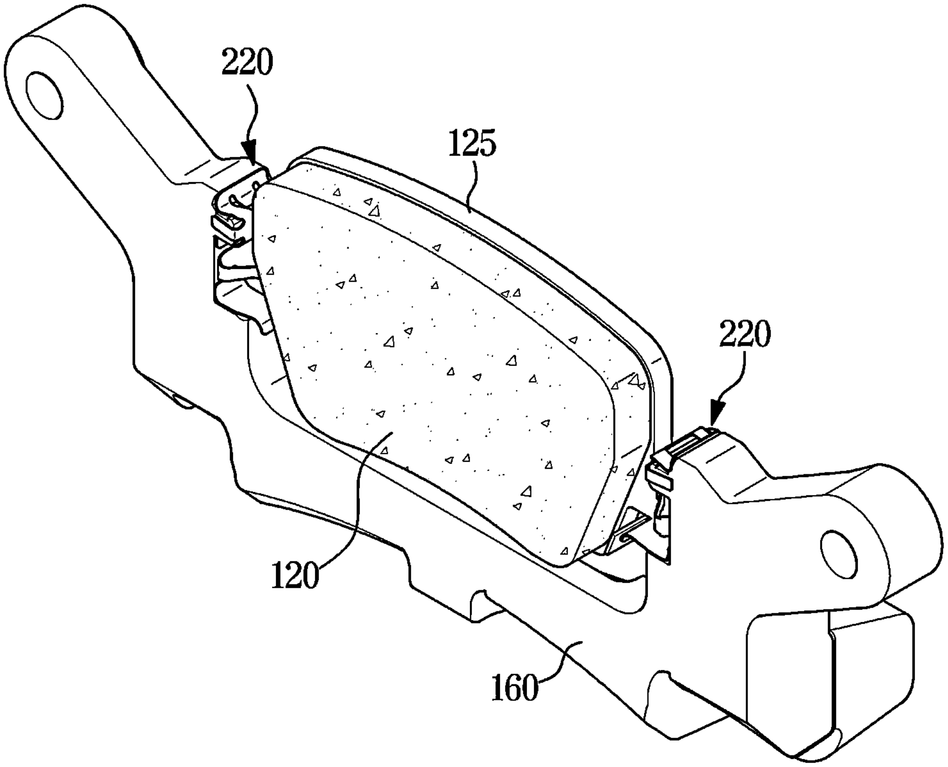
FIG. 16 is a perspective view illustrating the carrier, an inner brake pad, and an inner pad spring according to the present embodiment.
Figure 17:
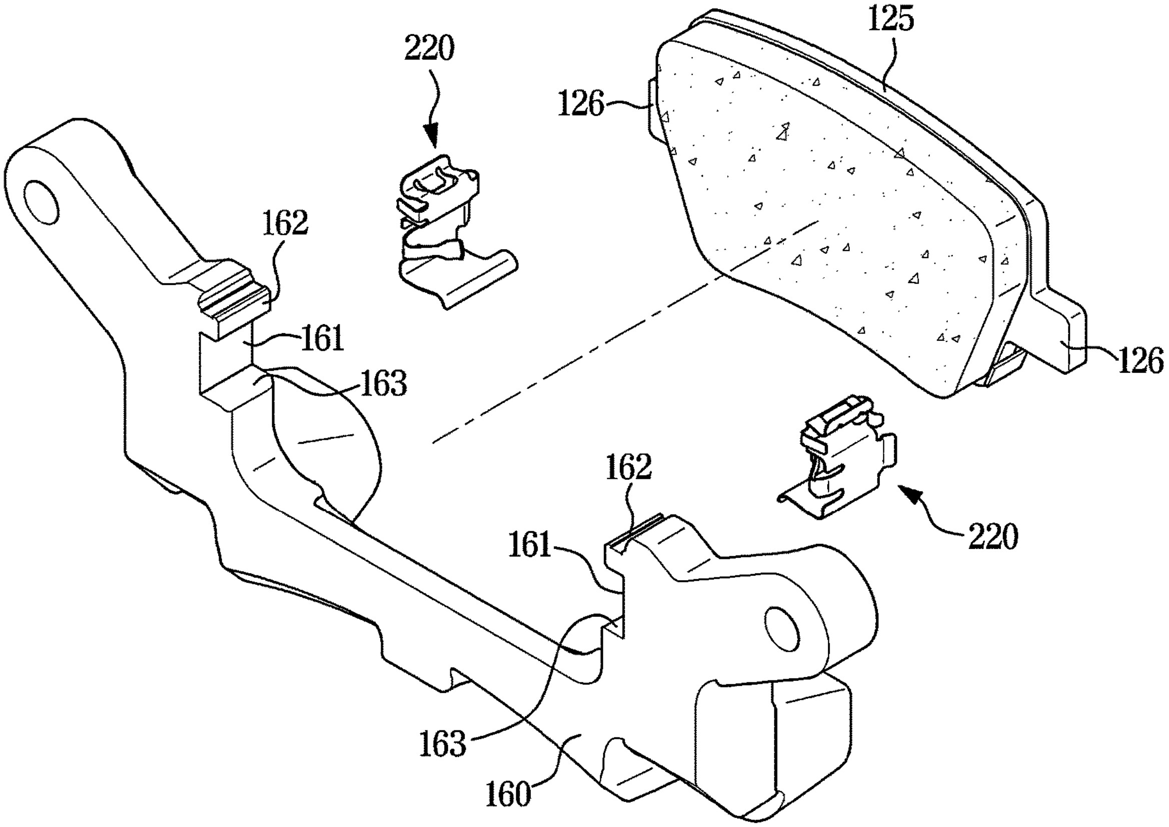
FIG. 17 is an exploded perspective view illustrating the carrier, the inner brake pad, and the inner pad spring according to the present embodiment.
Figure 18:
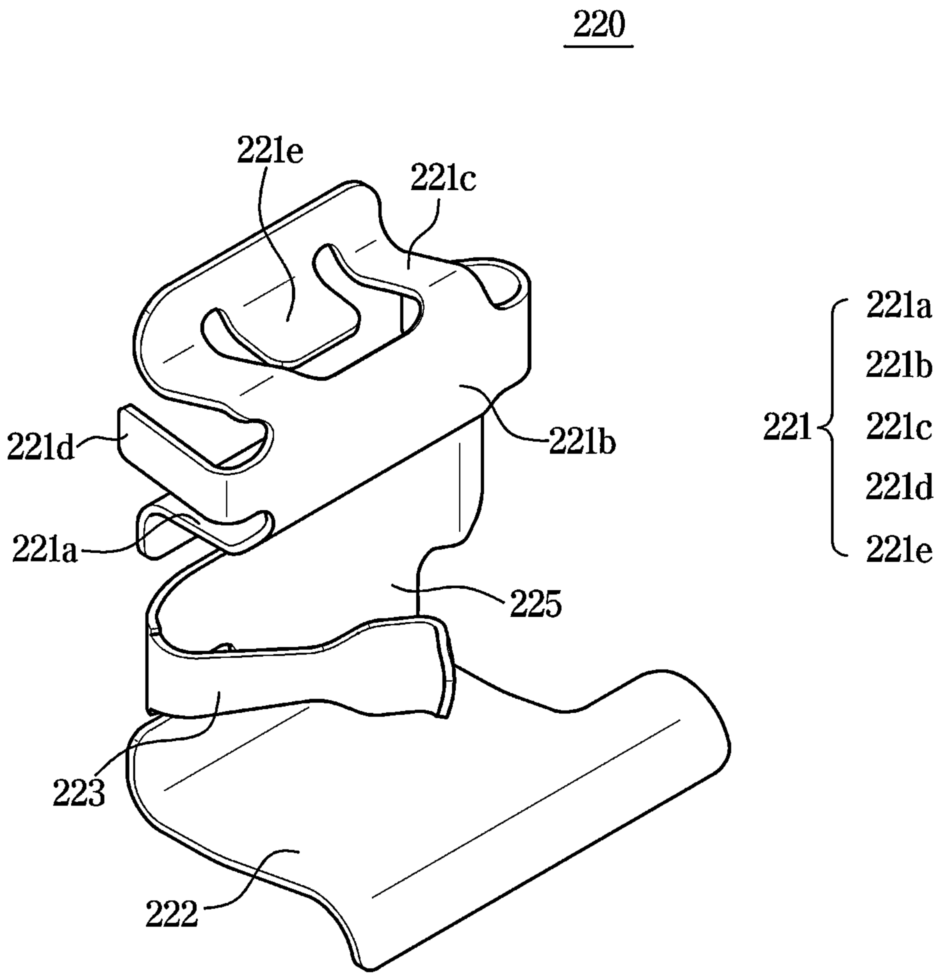
FIG. 18 is a perspective view illustrating the inner pad spring according to the present embodiment.
Figure 19:
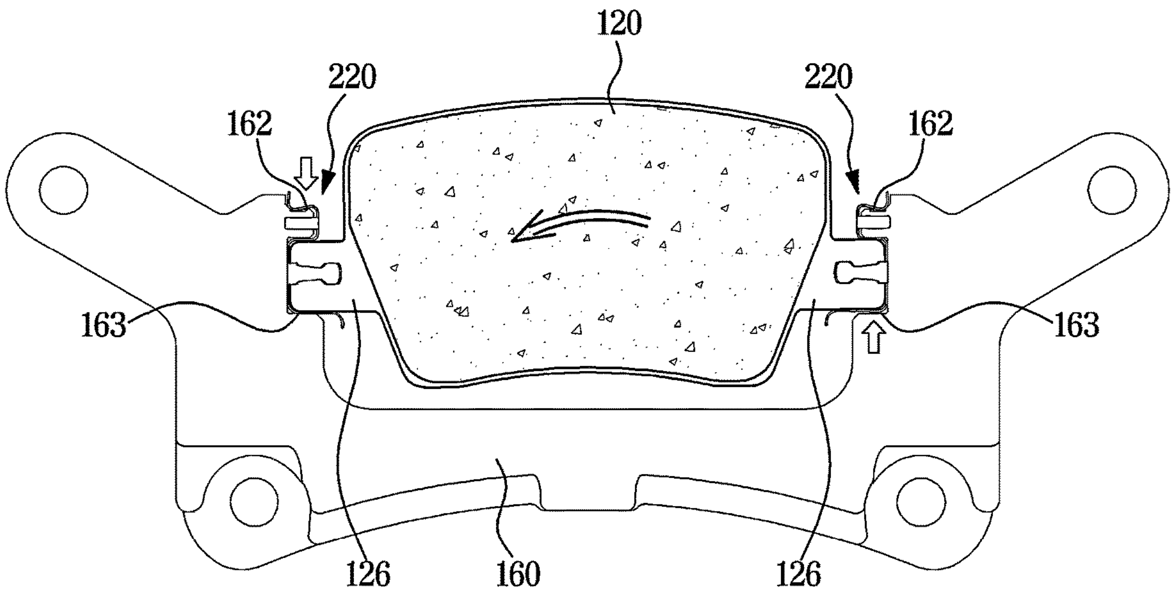
FIG. 19 is a front view illustrating the carrier, the inner brake pad, and the inner pad spring according to the present embodiment and a view illustrating a state in which the load applied in one direction is supported.
Figure 20:
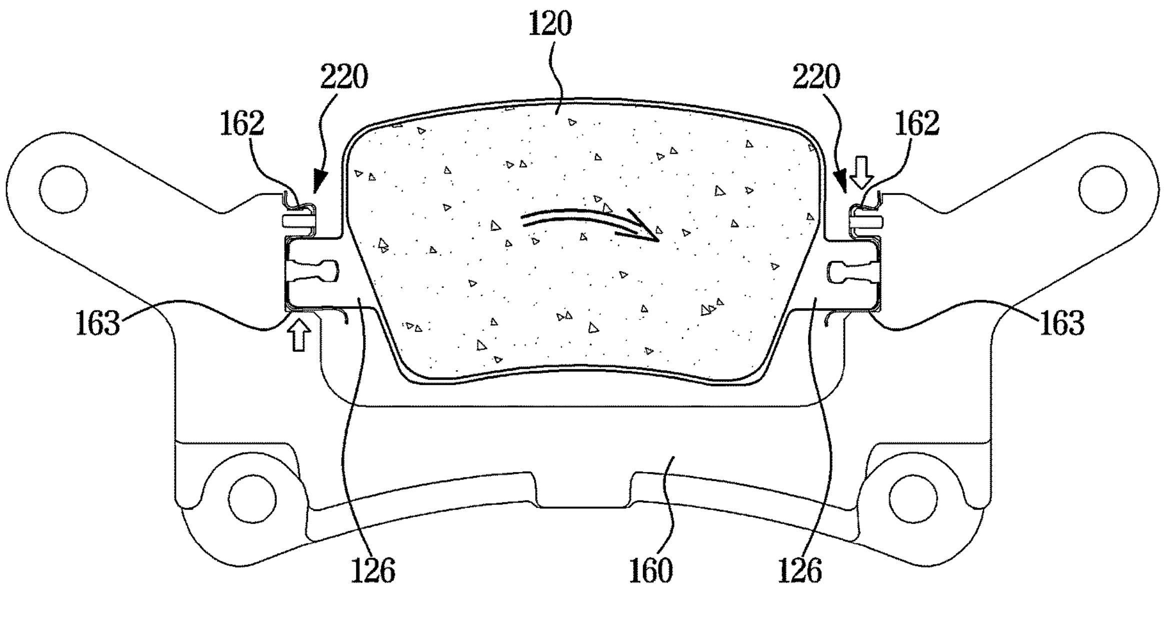
FIG. 20 is a front view illustrating the carrier, the inner brake pad, and the inner pad spring according to the present embodiment and a view illustrating a state in which the load applied in the other direction is supported.

FIG. 16 is a perspective view illustrating the carrier 160, the inner brake pad 120 according to the present embodiment, and the inner pad spring 220, and FIG. 17 is an exploded perspective view illustrating the carrier 160, the inner brake pad 120, and the inner pad spring 220 according to the present embodiment. Further, FIG. 18 is a perspective view illustrating the inner pad spring 220 according to the present embodiment, FIG. 19 is a front view illustrating the carrier 160, the inner brake pad 120, and the inner pad spring 220 according to the present embodiment and is a view illustrating a state in which the load is supported by a first catching support step 162 and a second catching support step 163, and FIG. 20 is a front view illustrating the carrier 160, the inner brake pad 120, and the inner pad spring 220 according to the present embodiment and is a view illustrating a state in which the load is supported by the first catching support step 162 and the second catching support step 163.

Referring to FIGS. 16 to 20, the inner pad spring 220 is provided to elastically support the inner brake pad 120 and the inner pad plate 125 on the carrier 160. The inner pad spring 220 is seated on and supported by an inner spring seat 161 formed in the carrier 160 while being mounted on the inner protrusion part 126 formed at a side end of the inner pad plate 125, and thus the inner brake pad 120 may be mounted on and installed in the carrier 160.

The inner spring seat 161 is recessed in the carrier 160 in the forward or rearward direction. Thus, at least portions of the inner protrusion part 126 and the inner pad spring 220 may be inserted thereinto and supported thereby, the first catching support step 162 may protrude inward toward a central portion from an upper side of the inner spring seat 161, and the second catching support step 163 may protrude inward from a lower side of the inner spring seat 161. When the brake disc and the brake pad are in close contact each other by the first catching support step 162 and the second catching support step 163 protruding from the upper side and the lower side of the inner spring seat 161, respectively, the inner pad plate 125 and the inner brake pad 120 can be stably supported despite the load applied by the rotating wheel and the rotating brake disc. A detailed description thereof will be made below with reference to FIGS. 19 and 20.

A pair of inner pad springs 220 may be provided on both sides of the inner pad plate 125. Referring to FIG. 18, the inner pad spring 220 may include a clip base 225, a first anchor portion 221 provided on an upper side of the clip base 225 and formed along the first catching support step 162 to elastically support the inner protrusion part 126 on the first catching support step 162, a second anchor portion 222 provided on a lower side of the clip base 225 to elastically support a lower end of the inner protrusion part 126, and a retainer portion 223 provided on a lateral side of the clip base 225 and in contact with and supported by a front surface of the inner protrusion part 126.

The clip base 225 forms a body and is provided to face or be in contact with a side end of the inner protrusion part 126 on the inner pad plate 125. The clip base 225 may be provided in a plate shape, and the first anchor portion 221, the second anchor portion 222, and the retainer portion 223 on the upper side, the lower side, and the lateral side may be continuously cut and bent from the clip base 225. In other words, the inner pad spring 220 is integrally provided as a single body and may be manufactured by cutting and bending the anchor portions 221 and 222, the retainer portion 223, or the like from the clip base 225, and accordingly, a structure and a manufacturing process can be simplified.

The first anchor portion 221 may extend and be bent along the first catching support step 162 to elastically support the inner protrusion part 126 on the first catching support step 162. The first anchor portion 221 may include a first tab 221*a* that is interposed between a lower end of the first catching support step 162 and an upper end of the inner protrusion part 126 by extending from an upper end of the clip base 255 toward the central portion along the upper end of the inner protrusion part 126, a second tab 221*b* that is bent and extends upward from the first tab 221*a* and faces a side surface of the first catching support step 162, a third tab 221*c* that extends from the second tab 221*a* toward a periphery and faces an upper end of the first catching support step 162, at least one first tensioner 221*d* bent and extending from at least one of a front end and a rear end of the second tab 221*b* toward a periphery, and a second tensioner 221*e* that is cut and bent from the third tab 221*c* toward the first catching support step 162 and is in direct contact with and supported by the upper end of the first catching support step 162. In this way, the first anchor portion 221 extends and is bent from the clip base 225 to surround the periphery of the first catching support step 162 so that the inner protrusion part 126 of the inner pad plate 125 may be elastically supported by the first catching support step 162.

The second anchor portion 222 may be in contact with and supported by the lower end of the inner protrusion part 126 to elastically support the lower end of the inner protrusion part 126, and at least a portion of the second anchor portion 222 may be interposed between the lower end of the inner protrusion part 126 and an upper end of the second catching support step 163. The second anchor portion 222 may be formed by continuously extending and being bent from a lower end of the clip base 225. The second anchor portion 222 may include a lip portion extending from the lower end of the clip base 225 toward the central portion along the lower end of the inner protrusion part 126 and formed to be inclined partially upward. Accordingly, the second anchor portion 222 may be elastically in contact with the lower end of the inner protrusion part 126 to elastically support the inner pad spring 220 on the inner protrusion part 126.

The retainer portion 223 is in contact with and supported by the front surface of the inner protrusion part 126. Accordingly, the inner pad spring 220 can be more stably and elastically supported by the inner protrusion part 126 of the inner pad plate 125, and at the same time, the inner pad spring 220 can be prevented from being separated from the inner protrusion part 126. The retainer portion 223 may be in contact with and supported by the front surface of the inner protrusion part 126 by being bent and curved and extending from a front end of the clip base 225 toward the front surface of the inner protrusion part 126. Meanwhile, although not illustrated in the drawings, a plurality of grooves may be recessed in the inner protrusion part 126 of the inner pad plate 125 so that various elastic components of the inner pad spring 220 are stably inserted and seated and are thus suppressed from being separated.

The first catching support step 162 and the second catching support step 163 protrude toward the central portion toward the pressing member 130, the inner spring seat 161 may be formed therebetween, and the first catching support step 162 and the second catching support step 163 are provided to withstand the load applied by the rotating brake disc.

Referring to FIGS. 19 and 20, the first catching support step 162 may protrude from an upper side of the inner spring seat 161, and the second catching support step 163 may protrude from a lower side of the inner spring seat 161. That is, the first catching support step 162 and the second catching support step 163 may protrude relative to the inner spring seat 161, and the inner spring seat 161 may be recessed relative to the first catching support step 162 and the second catching support step 163.

When the brake disc and the inner brake pad 120 are in close contact with each other for braking the vehicle in a state in which the wheel and the brake disc rotate in one direction (clockwise direction in FIG. 19), a load is generated in the inner pad plate 125 and the inner brake pad 120 in the same direction as the rotational direction of the brake disc. In this case, the first catching support step 162 on one side (left side in FIG. 19) and the second catching support step 163 on the other side (right side in FIG. 19) may stably support a load applied to the inner pad plate 125 and thus may maintain a constant braking force for the vehicle despite the load.

In contrast, when the brake disc and the inner brake pad 120 are in close contact with each other for braking the vehicle in a state in which the wheel and the brake disc rotate in the other direction (counterclockwise direction in FIG. 20), a load is generated in the inner pad plate 125 and the inner brake pad 120 in the same direction as the rotational direction of the brake disc. In this case, the second catching support step 163 on one side (left side in FIG. 20) and the first catching support step 162 on the other side (right side in FIG. 20) may stably support the load applied to the inner pad plate 125 and thus may maintain a constant braking force for the vehicle.

The pressing member 130 may receive the driving force from the actuator 270 and press the inner pad plate 125 toward the brake disc.

Referring back to FIGS. 3 and 4, the actuator 270 may include a motor 271 that provides power to provide the driving force for moving the pressing member 130 forward or rearward, a power conversion unit 272 that converts the rotational power provided by the motor 271 into linear movement and generates forward or rearward movement of the pressing member 130, and a speed reduction unit (not illustrated) that reduces the power provided by the motor 271 and transfers the reduced power to the power conversion unit 272.

The motor 271 may operate by receiving power from a power supply device such as a battery of a vehicle, generate rotational power, and transfer the generated rotational power to the speed reduction unit. Various structures such as a planetary gear assembly or a worm structure are applied to the speed reduction unit, the speed reduction unit may reduce the power of the motor 271 to transfer the reduced power to the power conversion unit 272, and the speed reduction unit is not limited to a device having one structure or operating method.

The power conversion unit 272 may include a spindle that rotates by receiving the reduced power from the speed reduction unit, a nut provided inside the pressing member 130 and screw-coupled to the spindle, and a rotation prevention unit (not illustrated) configured to prevent rotation of the nut so that the nut and the pressing member 130 do not rotate and perform linear movement. The spindle may rotate in a first direction by the power transferred through the motor 271 and the speed reduction unit, and accordingly, move the nut and the pressing member 130 forward toward the inner pad plate 125 so that the vehicle may be braked. Further, the spindle rotates in a second direction opposite to the first direction by the power transferred through the motor 271 and the speed reduction unit, and accordingly, spaces the nut and the pressing member 130 apart from the inner pad plate 125 so that the braking of the vehicle is released.

Hereinafter, an operation of the caliper brake 1 according to the present embodiment will be described.

Figure 21:
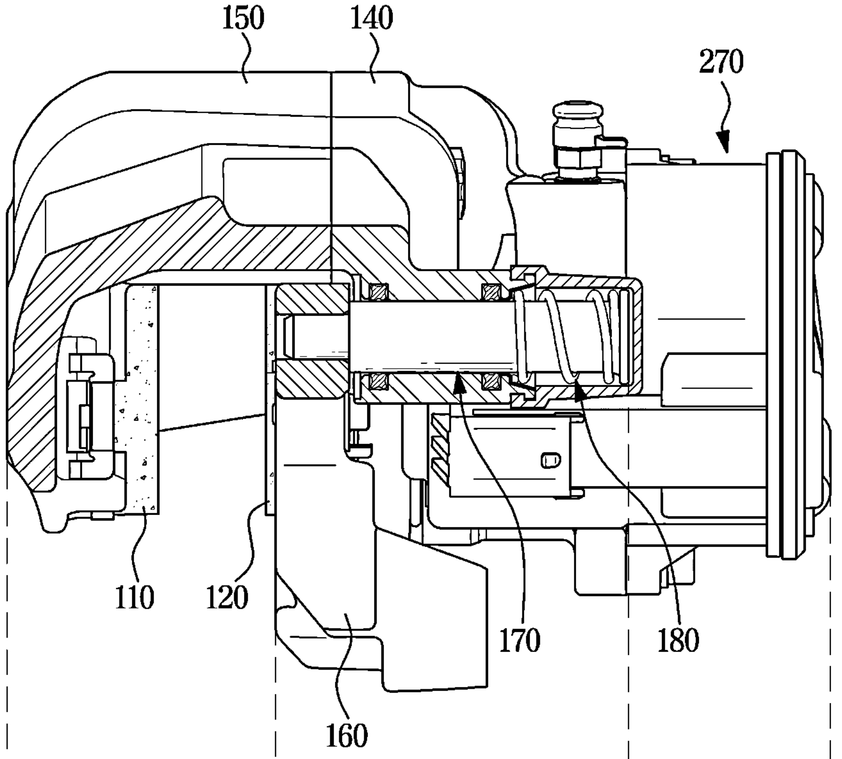
FIG. 21 is a side cross-sectional view illustrating an operating state of the caliper brake according to the present embodiment.
Figure 21:
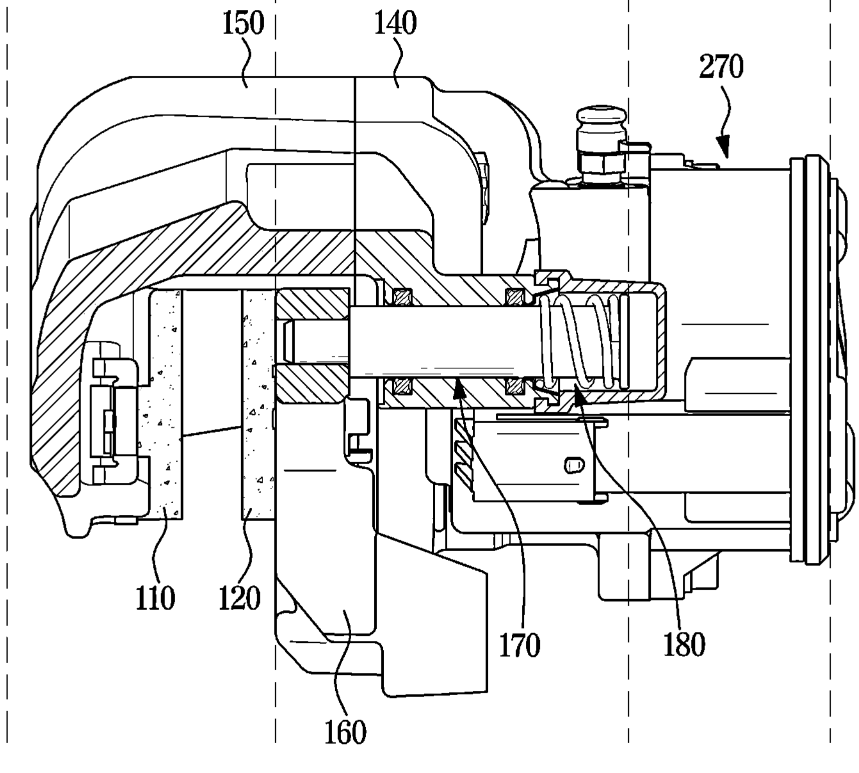

FIG. 21 is a side cross-sectional view illustrating an operating state of the caliper brake 1 according to the present embodiment, FIG. 21A is a cross-sectional view illustrating a state before the braking or the braking release state of the vehicle, and FIG. 21B is a cross-sectional view illustrating a braking state of the vehicle.

When the vehicle is braked, the pressing member 130 moves forward toward the inner pad plate 125 and presses the inner pad plate 125 and the inner brake pad 120 toward the brake disc by the hydraulic pressure of a pressurized medium such as a brake oil or the operation of the actuator 270. The caliper housing 140 and the caliper bridge 150 slidably move together in the direction opposite to the movement direction of the pressing member 130 due to a reaction force caused by the forward movement of the pressing member 130. In this case, the guide rod 170 is fixedly installed in the carrier 160 and maintained at a certain position, and the sliding movement of the caliper housing 140 and the caliper bridge 150 is guided by the guide rod 170. As the caliper housing 140 and the caliper bridge 150 slidably move in the direction opposite to the movement direction of the pressing member 130, the outer pad plate 115 and the outer brake pad 110 installed in the caliper bridge 150 also move toward and press the brake disc, and thus are in close contact with the brake disc so that the vehicle can be braked. When the braking of the vehicle is to be released, the caliper housing 140 and the caliper bridge 150 return to the original positions thereof by the restoring device 180 as illustrated in FIG. 21A.

As is apparent from the above description, in a caliper brake according to the present embodiment, a component structure and an appearance can be simplified.

In the caliper brake according to the present embodiment, the number of components is reduced so that manufacturing costs can be reduced and productivity can be improved.

In the caliper brake according to the present embodiment, a beautiful appearance can be achieved despite the application of an actuator having a motor.

In the caliper brake according to the present embodiment, a vehicle can be stably braked even in various operating situations without installing an additional component.

In the caliper brake according to the present embodiment, a structure thereof is simple, and thus easy maintenance can be achieved.

In the caliper brake according to the present embodiment, the size and volume of a product can be reduced, thereby improving the applicability of a vehicle, and achieving space utilization of the vehicle.

In the caliper brake according to the present embodiment, the marketability and competitiveness of the vehicle can be improved.

What is claimed is:

1. A caliper brake comprising:

an inner brake pad and an outer brake pad arranged on both sides of a brake disc rotating together with a wheel;

a pressing member configured to press the inner brake pad toward the brake disc;

a caliper housing provided such that the pressing member moves forward or rearward;

a caliper bridge connected to the caliper housing and configured to press the outer brake pad toward the brake disc by a reaction force according to an operation of the pressing member;

a carrier fixedly installed in a vehicle body;

at least one guide rod fixedly installed in the carrier and configured to guide sliding movement of the caliper housing and the caliper bridge relative to the carrier; and at least one outer pad spring mounted on a protrusion part formed at a side end of an outer pad plate on which the outer brake pad is fixedly installed and configured to elastically support the outer brake pad, wherein the caliper bridge includes:

an outer pad seat on which at least portions of the outer pad spring and the protrusion part are seated;

a first torque support step protruding from an upper side of the outer pad seat and facing an upper end of the protrusion part or one side of the outer pad spring; and a second torque support step protruding from a lower side of the outer pad seat and facing a lower end of the protrusion part or the other side of the outer pad spring, wherein the outer pad spring includes:

a first fastening portion facing a first circumferential outer surface of the first torque support step, wherein the first circumferential outer surface is arranged to face away from the side end of the outer brake pad along the circumferential direction of the disc; and a second fastening portion facing a second circumferential outer surface of the second torque support step, wherein the second circumferential outer surface is arranged to face away from the side end of the outer brake pad along the circumferential direction of the disc.

2. The caliper brake of claim 1, wherein the outer pad plate further includes a restraint protrusion provided on a rear surface of the protrusion part, and the outer pad spring further includes:

a base disposed to face the rear surface of the protrusion part; and a fastening hole which is formed through the base and which the restraint protrusion is inserted into and bound to.

3. A caliper brake comprising:

an inner brake pad and an outer brake pad arranged on both sides of a brake disc rotating together with a wheel;

a pressing member configured to press the inner brake pad toward the brake disc;

a caliper housing provided such that the pressing member moves forward or rearward;

a caliper bridge connected to the caliper housing and configured to press the outer brake pad toward the brake disc by a reaction force according to an operation of the pressing member;

a carrier fixedly installed in a vehicle body;

at least one guide rod fixedly installed in the carrier and configured to guide sliding movement of the caliper housing and the caliper bridge relative to the carrier; and at least one outer pad spring mounted on a protrusion part formed at a side end of an outer pad plate on which the outer brake pad is fixedly installed and configured to elastically support the outer brake pad, wherein the caliper bridge includes:

an outer pad seat on which at least portions of the outer pad spring and the protrusion part are seated;

a first torque support step protruding from an upper side of the outer pad seat and facing an upper end of the protrusion part or one side of the outer pad spring; and a second torque support step protruding from a lower side of the outer pad seat and facing a lower end of the protrusion part or the other side of the outer pad spring, wherein the outer pad plate further includes a restraint protrusion provided on a rear surface of the protrusion part, and the outer pad spring further includes:

a base disposed to face the rear surface of the protrusion part; and a fastening hole which is formed through the base and which the restraint protrusion is inserted into and bound to, wherein a center line between the upper end and the lower end of the protrusion part is disposed to be biased upward from a center line between an upper end and a lower end of the restraint protrusion or the fastening hole.

4. The caliper brake of claim 3, wherein the restraint protrusion is bound to the fastening hole by riveting.

5. The caliper brake of claim 3, wherein the outer pad spring further includes:

a first support surface interposed between the upper end of the protrusion part and a lower end of the first torque support step; and a second support surface interposed between the lower end of the protrusion part and an upper end of the second torque support step.

6. The caliper brake of claim 5, wherein, to support the outer pad spring, the caliper bridge further includes:

a first outer spring fastening groove recessed in an outer surface of the first torque support step; and a second outer spring fastening groove recessed in an outer surface of the second torque support step.

7. The caliper brake of claim 6, wherein the outer pad spring further includes:

a first fastening portion inserted into the first outer spring fastening groove; and a second fastening portion inserted into the second outer spring fastening groove.

8. The caliper brake of claim 7, wherein the first support surface extends and is bent from an upper end of the base, and the second support surface extends and is bent from a lower end of the base.

9. The caliper brake of claim 8, wherein the first fastening portion is bent and extends forward from a side end of the first support surface, the second fastening portion is bent and extends forward from a side end of the second support surface, the first fastening portion includes a first fastening tab that is bent and extends inward from the first outer spring fastening groove, and the second fastening portion includes a second fastening tab that is bent and extends inward from the second outer spring fastening groove.

10. The caliper brake of claim 3, wherein the caliper bridge is provided to surround the outer brake pad and cover a front surface of the caliper housing.

11. The caliper brake of claim 10, wherein the caliper bridge includes a display device, at least a portion of which is formed as a flat surface so that a logo or emblem is applied to a front surface thereof.

12. The caliper brake of claim 10, wherein the caliper housing includes a guide hole formed to pass through in a forward or rearward direction, and the guide rod is provided to extend in the forward or rearward direction and to be inserted into and pass through the guide hole.

13. The caliper brake of claim 12, further comprising:

a restoring device configured to elastically support the caliper housing and the caliper bridge relative to the carrier in a direction in which the caliper housing and the caliper bridge return to original positions thereof, wherein the restoring device is provided on an outer surface of the guide rod.

14. The caliper brake of claim 13, wherein the restoring device includes:

a return spring disposed along an outer circumferential surface of the guide rod;

a first support portion provided on the guide rod and configured to support one end of the return spring; and a second support portion provided on the guide rod and configured to support the other end of the return spring.

15. The caliper brake of claim 14, wherein the first support portion protrudes from one side on the outer circumferential surface of the guide rod and is provided as a retainer into which the one end of the return spring is inserted or supported thereby.

16. The caliper brake of claim 14, wherein the second support portion extends outward from the other side on the outer circumferential surface of the guide rod in a radial direction and is provided as a support step by which the other end of the return spring is supported.

17. The caliper brake of claim 12, wherein a pair of guide rods are provided on both sides of the pressing member with respect to an axial direction.

18. The caliper brake of claim 12, further comprising:

a guide cap provided with an accommodation space in which at least portions of the restoring device and the guide rod are accommodated and configured to cover an opening at one end of the guide hole.

19. The caliper brake of claim 12, further comprising:

at least one sealing member disposed between an outer circumferential surface of the guide rod and an inner circumferential surface of the guide hole.

20. The caliper brake of claim 12, wherein the caliper bridge and the caliper housing are coupled to each other by at least one fastening member.

* * * * *